US008089477B2

(12) United States Patent
Shirouzu et al.

(10) Patent No.: US 8,089,477 B2
(45) Date of Patent: Jan. 3, 2012

(54) DISPLAY DEVICE AND METHOD FOR CONTROLLING THE SAME

(75) Inventors: Hiroshi Shirouzu, Fukuoka (JP); Tetsurou Nakamura, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/797,150

(22) Filed: Jun. 9, 2010

(65) Prior Publication Data

US 2010/0245331 A1 Sep. 30, 2010

Related U.S. Application Data

(63) Continuation of application No. PCT/JP2009/003032, filed on Jun. 30, 2009.

(30) Foreign Application Priority Data

Jul. 4, 2008 (JP) ................................ 2008-176375

(51) Int. Cl.
*G06F 3/038* (2006.01)
*G09G 5/00* (2006.01)

(52) U.S. Cl. ........................................ 345/212; 345/76

(58) Field of Classification Search .............. 345/76–80, 345/82, 211–213
See application file for complete search history.

(56) References Cited

U.S. PATENT DOCUMENTS 6,989,826 B2 1/2006 Kasai
7,466,311 B2 12/2008 Kasai
2003/0030602 A1 2/2003 Kasai
2006/0114192 A1 6/2006 Kasai
2006/0119549 A1 6/2006 Maekawa
2008/0030438 A1 2/2008 Marx et al.
2008/0074362 A1 3/2008 Ogura
2008/0074413 A1 3/2008 Ogura
2008/0150845 A1 6/2008 Ishii et al.
2009/0079677 A1 3/2009 Kasai

FOREIGN PATENT DOCUMENTS

JP 2003-114645 4/2003
JP 2005-115144 4/2005
JP 2006-139079 6/2006
JP 2007-536585 12/2007
JP 2008-102404 5/2008
JP 2008-107772 5/2008
JP 2008-107774 5/2008
JP 2009-104104 5/2009
WO 2005/109389 11/2005
WO 2008/038819 4/2008
WO 2008/149736 12/2008

OTHER PUBLICATIONS

Kenji Okumoto, "Organic Electroluminescence Display Device and Manufacturing Method Thereof", U.S. Appl. No. 12/855,027, Aug. 2010.

*Primary Examiner* — Ricardo L Osorio
(74) *Attorney, Agent, or Firm* — Greenblum & Bernstein, P.L.C.

(57) ABSTRACT

A display device is provided which includes a luminescence element, a data line, and a switch connected between an electrode of the luminescence element and the data line. A voltage generation circuit supplies a pre-charge voltage to the data line. A current generation circuit supplies an inspection current to the electrode of the luminescence element plural times through the data line and the switch. A voltage detection circuit detects, the plural times, voltage values of the electrode supplied with the inspection current. When a difference between the voltage values is at least a predetermined value, the voltage generation circuit supplies the data line with an updated voltage that is higher than the pre-charge voltage.

14 Claims, 15 Drawing Sheets

DISPLAY DEVICE AND METHOD FOR CONTROLLING THE SAME

CROSS REFERENCE TO RELATED APPLICATION

This is a continuation application of PCT Application No. PCT/JP2009/003032 filed Jun. 30, 2009, designating the United States of America, the disclosure of which, including the specification, drawings, and claims, is incorporated herein by reference in its entirety.

The disclosure of Japanese Patent Application No. 2008-176375 filed on Jul. 4, 2008, including specification, drawings, and claims, is incorporated herein by reference in its entirety.

BACKGROUND OF THE INVENTION

1. Field of the Invention

The present invention relates to display devices and methods for controlling the same, and in particular, to a method for evaluating characteristics of luminescence elements.

2. Description of the Related Art

Image display devices in which organic EL elements (also known as organic light emitting diodes, or OLEDs) are used, that is, organic EL displays are known as image display devices with which current-driven luminescence elements are used. Organic EL displays are attracting attention as candidates of the next-generation flat panel display (FPD) because they have advantages of good viewing angle properties and small power consumption.

In a usual organic EL display, organic EL elements which serve as pixels are arranged in a matrix. An organic EL display is called a passive-matrix organic EL display, in which organic electroluminescence elements are provided at intersections of row electrodes (scanning lines) and column electrodes (data lines) and voltages corresponding to data signals are applied to between selected row electrodes and the column electrodes to drive the organic EL elements.

On the other hand, an organic EL display is called an active-matrix organic EL display, in which thin film transistors (TFTs) are provided at intersections of row electrodes (scanning lines) and column electrodes (data lines) and connected with gates of driving transistors which receive data signals, when the TFTs are turned on through selected scanning lines, through the data lines and activate the organic EL elements.

Unlike the passive-matrix organic EL display, in which organic EL elements connected to selected row electrodes (scanning lines) emit light only until the selected row electrodes become unselected, organic EL elements in the active-matrix organic EL display keep emitting light until they are scanned (or selected) again; thus causing no reduction in luminance even when a duty ratio increases. Accordingly, the active-matrix organic EL display is operated at a low voltage, thereby consuming less power. However, a problem of unevenness in luminance occurs in the active-matrix organic EL display because luminances are different among pixels due to a variation in characteristics of driving transistors or organic EL elements even when the same data signals are provided.

In conventional organic EL displays, such unevenness in luminance due to a variation in characteristics (hereinafter collectively referred to as unevenness in characteristics) which is caused in a manufacturing process, of driving transistors or organic EL elements has typically been compensated by using complicated pixel circuitry or by using an external memory.

Using complicated pixel circuitry, however, reduces yields. In addition, such circuitry cannot compensate unevenness in the light emission efficiencies of the organic EL elements of the respective pixels.

For these reasons, several methods have been proposed for compensating unevenness in characteristics among pixels using an external memory.

For example, for a substrate for a luminescent panel, a method for testing the substrate for the luminescent panel, and a luminescent panel disclosed in Patent Reference 1 (Japanese Unexamined Patent Application Publication Number 2006-139079), pixels are tested and characteristics of the pixels are extracted by detecting relationship between a signal voltage and a current flowing in a driving transistor by measuring, before the EL element is formed on the substrate for a luminescent panel, a current flowing in a test line connected to a diode-connected transistor which is connected to a conventional voltage-driven pixel circuit including two transistors and serves to resemble an EL element. After the EL element is formed, the diode-connected transistor can be made reverse-biased using the test line, so that a current is prevented from flowing in the diode-connected transistor and thereby usual operation of writing a voltage can be performed. The characteristics detected as data items of a matrix can be utilized for controlling correction of voltage applied to a data line when an organic EL panel is used.

SUMMARY OF THE INVENTION

However, in the display device having organic EL elements as described above, not only the transistors but also the organic EL elements suffer from inherent unevenness and deteriorative changes in characteristics, which means that luminance unevenness of pixels is not compensated in the conventional methods in which no organic EL characteristics are detected.

Particularly, the organic EL luminescence elements have the problem of burn-in that is a degradation phenomenon attributed to changes over time. The burn-in problem may be compensated for by feeding back the current-voltage characteristics of the organic EL luminescence elements, but an actual pixel circuit has high interconnection resistance and high internal resistance of switching elements and also has large parasitic capacitors, thus requiring a long charge time after allowing a current to flow to inspect the I-V characteristic until the voltage of the organic EL element is read out. Hence such a display device having organic EL elements as conventionally known has a problem that it is not capable of correctly compensating characteristics of the organic EL elements at high speeds.

In view of the above problem, the present invention has an object to provide a display device which includes an electronic circuit having a luminescence element represented by an organic EL element and is capable of correctly detecting a current-voltage characteristic of the luminescence element at high speeds, and provide a method for controlling the display device.

In order to achieve the aforementioned object, the display device according to an aspect of the present invention includes: a luminescence element; a first power line electrically connected to a first electrode of the luminescence element; a second power line electrically connected to a second electrode of the luminescence element; a capacitor which holds a voltage; a driving element which is provided between the first electrode and the first power line and which causes the luminescence element to emit light, by passing a current between the first power line and the second power line, the current corresponding to the voltage held by the capacitor; a data line through which a signal voltage is supplied to one of electrodes of the capacitor; a first switching element which causes the capacitor to hold a voltage corresponding to the signal voltage; a voltage generation circuit which supplies the signal voltage to the data line and supplies a predetermined voltage to the data line to precharge the data line to the predetermined voltage; a current generation circuit which is connected to the data line and supplies a predetermined inspection current to the luminescence element; a voltage detection circuit which is connected to the data line and detects a voltage of the luminescence element; a connection line disposed between the first electrode and the data line; a second switching element disposed on the connection line, which connects the first electrode and the data line; and a control unit configured to (i) turn off the first switching element to turn off the driving element, (ii) turn on the second switching element, (iii) cause the voltage generation circuit to supply the predetermined voltage to the data line to precharge the data line to the predetermined voltage, (iv) cause the current generation circuit to supply the predetermined inspection current to the luminescence element through the data line and the connection line, and (v) cause the voltage detection circuit to detect through the data line and the connection line a voltage of the first electrode supplied with the predetermined inspection current, wherein the control unit is configured to (i) cause the current generation circuit to supply the predetermined inspection current to the luminescence element plural times through the data line and the connection line, (ii) cause the voltage detection circuit to detect plural times through the data line and the connection line the voltage of the first electrode supplied with the predetermined inspection current, and (iii) cause the voltage generation circuit to supply the data line with an updated voltage that is higher than the predetermined voltage, to precharge the data line further to the updated voltage when a difference in value of the voltage of the first electrode detected plural times is equal to or larger than a predetermined value.

When the display device and the method for controlling the same according to the aspect of the present invention are employed, conductive lines in an electronic circuit including a semiconductor element or in a display device including a luminescence element can be precharged before measuring current-voltage characteristics of the semiconductor element and luminescence element, and in the case where the measured voltage is unstable due to the above precharge, a precharge condition will be reset, allowing for fast and accurate measurement of the current-voltage characteristics.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings.

DESCRIPTION OF THE PREFERRED EMBODIMENTS

Figure 1:
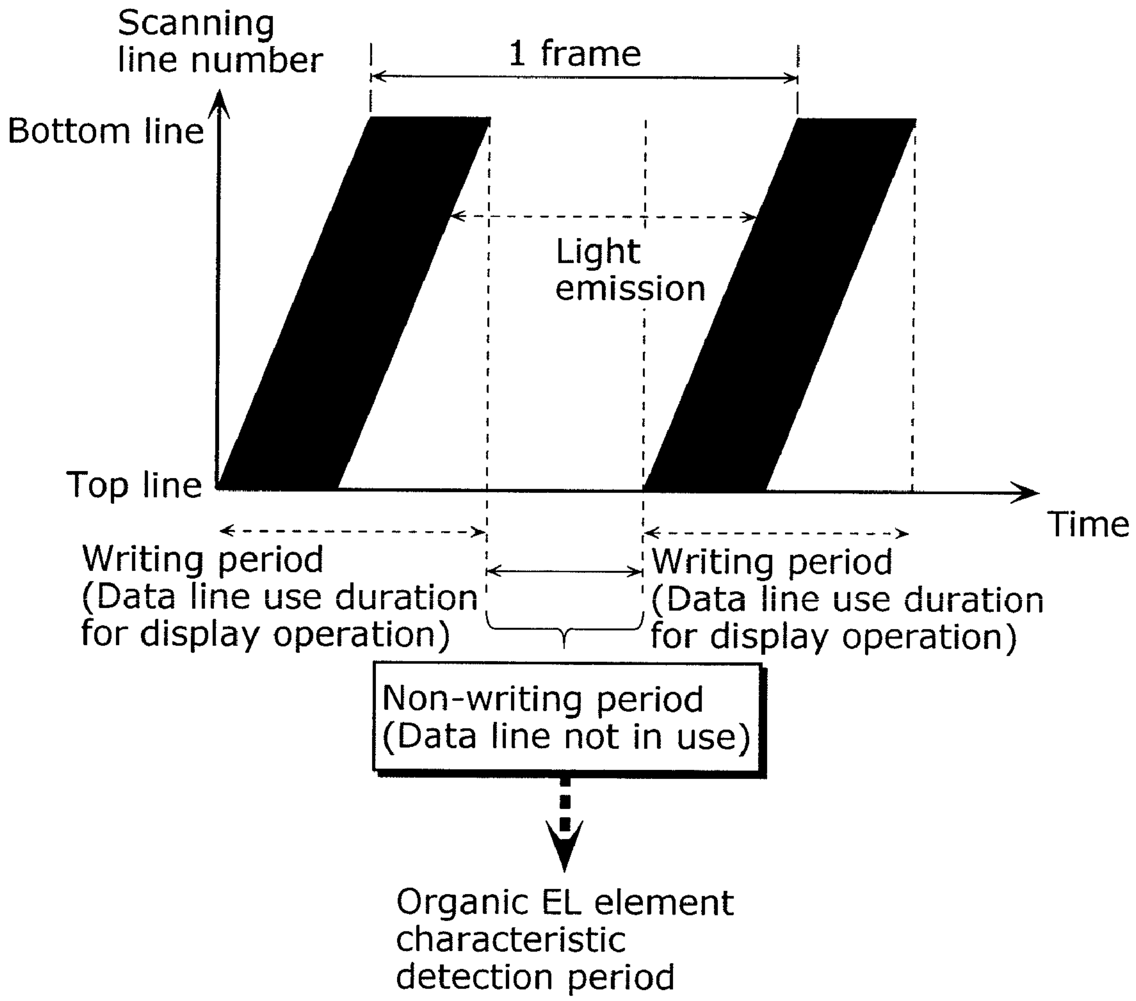
FIG. 1 is a state transition diagram of a display unit of a generally-used active-matrix type display device.

According to one aspect of the present disclosure, a display device includes: a luminescence element; a first power line electrically connected to a first electrode of the luminescence element; a second power line electrically connected to a second electrode of the luminescence element; a capacitor which holds a voltage; a driving element which is provided between the first electrode and the first power line and which causes the luminescence element to emit light, by passing a current between the first power line and the second power line, the current corresponding to the voltage held by the capacitor; a data line through which a signal voltage is supplied to one of electrodes of the capacitor; a first switching element which causes the capacitor to hold a voltage corresponding to the signal voltage; a voltage generation circuit which supplies the signal voltage to the data line and supplies a predetermined voltage to the data line to precharge the data line to the predetermined voltage; a current generation circuit which is connected to the data line and supplies a predetermined inspection current to the luminescence element; a voltage detection circuit which is connected to the data line and detects a voltage of the luminescence element; a connection line disposed between the first electrode and the data line; a second switching element disposed on the connection line, which connects the first electrode and the data line; and a control unit configured to (i) turn off the first switching element to turn off the driving element, (ii) turn on the second switching element, (iii) cause the voltage generation circuit to supply the predetermined voltage to the data line to precharge the data line to the predetermined voltage, (iv) cause the current generation circuit to supply the predetermined inspection current to the luminescence element through the data line and the connection line, and (v) cause the voltage detection circuit to detect through the data line and the connection line a voltage of the first electrode supplied with the predetermined inspection current, wherein the control unit is configured to (i) cause the current generation circuit to supply the predetermined inspection current to the luminescence element plural times through the data line and the connection line, (ii) cause the voltage detection circuit to detect plural times through the data line and the connection line the voltage of the first electrode supplied with the predetermined inspection current, and (iii) cause the voltage generation circuit to supply the data line with an updated voltage that is higher than the predetermined voltage, to precharge the data line further to the updated voltage when a difference in value of the voltage of the first electrode detected plural times is equal to or larger than a predetermined value.

According to the present aspect of the invention, the voltage generation circuit is caused to supply a predetermined voltage to the data line to precharge the data line to the predetermined voltage, the current generation circuit is caused to supply a predetermined inspection current to the luminescence element through the data line, and the voltage detection circuit is caused to detect through the data line a voltage of the first electrode of the luminescence element supplied with the predetermined inspection current. The data line is thus supplied with the predetermined voltage and precharged thereto so that distributed capacity connected to the data line becomes charged to the predetermined voltage, before the inspection current flows through the luminescence element. This can drastically shorten the charging time required until the voltage of the first electrode of the luminescence element is detected after passing the inspection current to the luminescence element. Video signals can therefore be correctly compensated at high speeds according to the characteristics of the luminescence element which deteriorate over time.

Further according to the present aspect of the invention, when the difference in value of the voltage of the first electrode detected plural times is equal to or larger than the predetermined value, it is determined that the voltage of the luminescence element is unstable, and the data line is supplied with an updated voltage higher than the predetermined voltage, to precharge the data line further to the updated voltage. This avoids using a detected electrical potential of the first electrode of the luminescence element which is unstable, in making determinations as to the voltage of the luminescence element. It is therefore possible to correctly detect the voltage of the luminescence element, with drastic reduction in the charging time required until the voltage of the first electrode of the luminescence element is detected after passing the inspection current to the luminescence element. The determination as to the voltage of the luminescence element can thus be free from error resulting from detection of the voltage of the first electrode of the luminescence element which is unstable.

According to another aspect of the present disclosure, the display device further includes a memory in which data is stored, wherein the control unit is configured to (i) cause the current generation circuit to supply the predetermined inspection current to the luminescence element plural times through the data line and the connection line after causing the voltage generation circuit to supply the data line with the updated voltage that is higher than the predetermined voltage, to precharge the data line further to the updated voltage, (ii) cause the voltage detection circuit to detect plural times through the data line and the connection line the voltage of the first electrode supplied with the predetermined inspection current, and (iii) store, in the memory, the voltage of the first electrode detected by the voltage detection circuit when a difference in value of the voltage of the first electrode detected plural times is smaller than the predetermined value.

According to the present aspect of the invention, when the difference in value of the voltage of the first electrode detected plural times is smaller than the predetermined value after the data line is precharged further to the updated voltage, it is determined that the voltage of the luminescence element is stable, and the voltage of the first electrode of the luminescence element detected by the voltage detection circuit is stored in the memory. The determination as to the voltage of the luminescence element is therefore made when the voltage of the first electrode of the luminescence element is stable. It is therefore possible to correctly detect the voltage of the luminescence element, with drastic reduction in the charging time required until the voltage of the first electrode of the luminescence element is detected after passing the inspection current to the luminescence element. The determination as to the voltage of the luminescence element can thus be free from error resulting from detection of the voltage of the first electrode of the luminescence element which is unstable.

According to yet another aspect of the present disclosure, the control unit is configured to store, in the memory, a last detected value of the voltage of the first electrode among values of the voltage of the first electrode detected by the voltage detection circuit.

According to the present aspect of the invention, the voltage of the first electrode of the luminescence element detected last in plural detections by the voltage detection circuit may be stored in the memory.

According to still another aspect of the present disclosure, the control unit is configured to (i) calculate a current-voltage characteristic of the luminescence element based on the predetermined inspection current and the stored voltage of the first electrode, (ii) correct a video signal received from outside, based on the current-voltage characteristic of the luminescence element, and (iii) cause the voltage generation circuit to supply the data line with a signal voltage corresponding to the corrected video signal.

According to the present aspect of the invention, the current-voltage characteristic of the luminescence element is calculated based on the predetermined inspection current and the stored voltage of the first electrode of the luminescence element, the video signal received from outside is corrected based on the current-voltage characteristic of the luminescence element, and the data line is supplied with the signal voltage corresponding to the corrected video signal. The current-voltage characteristic of the luminescence element is thus calculated based on the correctly determined voltage of the luminescence element, even with drastic reduction in the charging time required until the voltage of the luminescence element is detected after passing the inspection current to the luminescence element, with the result that the video signal can be correctly compensated at high speeds according to the characteristic of the luminescence element which deteriorates over time.

According to an additional aspect of the present disclosure, the display device further includes a memory in which data is stored, wherein the control unit is configured to (i) cause the current generation circuit to supply the predetermined inspection current to the luminescence element plural times through the data line and the connection line, (ii) cause the voltage detection circuit to detect plural times through the data line and the connection line the voltage of the first electrode supplied with the predetermined inspection current, and (iii) store, in the memory, the voltage of the first electrode detected by the voltage detection circuit when a difference in value of the voltage of the first electrode detected plural times is smaller than the predetermined value.

According to the present aspect of the invention, when the difference in value of the voltage of the first electrode detected plural times is smaller than the predetermined value, it is determined that the voltage of the luminescence element is stable, and the voltage of the first electrode of the luminescence element detected by the voltage detection circuit is stored in the memory. The determination as to the voltage of the luminescence element is thus made based on the voltage of the first electrode of the luminescence element detected when the voltage of the luminescence element is stable. It is therefore possible to correctly detect the voltage of the luminescence element, with drastic reduction in the charging time required until the voltage of the luminescence element is detected after passing the inspection current to the luminescence element.

According to another aspect of the present disclosure, the control unit is configured to store, in the memory, a last detected value of the voltage of the first electrode among values of the voltage of the first electrode detected by the voltage detection circuit.

According to the present aspect of the invention, the voltage of the first electrode of the luminescence element detected last in plural detections by the voltage detection circuit may be stored in the memory.

According to yet another aspect of the present disclosure, the control unit is configured to (i) calculate a current-voltage characteristic of the luminescence element based on the predetermined inspection current and the stored voltage of the first electrode, (ii) correct a video signal received from outside, based on the current-voltage characteristic of the luminescence element, and (iii) cause the voltage generation circuit to supply the data line with a signal voltage corresponding to the corrected video signal.

According to the present aspect of the invention, the current-voltage characteristic of the luminescence element is calculated based on the predetermined inspection current and the stored voltage of the first electrode of the luminescence element, the video signal received from outside is corrected based on the current-voltage characteristic of the luminescence element, and the data line is supplied with the signal voltage corresponding to the corrected video signal. The current-voltage characteristic of the luminescence element is thus calculated based on the correctly determined voltage of the luminescence element, even with drastic reduction in the charging time required until the voltage of the luminescence element is detected after passing the inspection current to the luminescence element, with the result that the video signal can be correctly compensated at high speeds according to the characteristic of the luminescence element which deteriorates over time.

According to still another aspect of the present disclosure, the control unit is configured to, during a period in which the data line is not supplied with the signal voltage corresponding to the video signal received from outside, (i) turn off the first switching element to turn off the driving element, (ii) turn on the second switching element, (iii) cause the voltage generation circuit to supply the predetermined voltage to the data line to precharge the data line to the predetermined voltage, (iv) cause the current generation circuit to supply the predetermined inspection current to the luminescence element through the data line and the connection line, and (v) cause the voltage detection circuit to detect through the data line and the connection line a voltage of the first electrode supplied with the predetermined inspection current.

According to the present aspect of the invention, during a period in which the data line is not supplied with the signal voltage corresponding to the video signal received from outside, the data line is precharged to the predetermined voltage and the voltage of the luminescence element is detected. The voltage of the luminescence element can be thus detected during the period in which the data line is not used, so that the current-voltage characteristic of the luminescence element can be calculated, even while video signals are outputted to the display device. This eliminates the need to set a separate period for calculating the current-voltage characteristics of the luminescence elements, from the period in which the video signals are outputted to the display device, and allows for simultaneous output of the video signals to the display device with prompt and adaptive correction of the video signals for the characteristics of luminescence elements which deteriorate over time.

According to an additional aspect of the present disclosure, the video signal is divided on a per-frame basis, and each frame has a writing period in which the signal voltage corresponding to the video signal for each pixel is written in the capacitor, and a non-writing period in which the signal voltage is not written in the capacitor, and the period in which the data line is not supplied with the signal voltage corresponding to the video signal received from outside is the non-writing period.

According to the present aspect of the invention, the period in which the data line is not supplied with the signal voltage corresponding to the video signal received from outside, may be the non-writing period.

According to another aspect of the present disclosure, the video signal is divided on a per-frame basis, and each frame has a writing period in which the signal voltage corresponding to the video signal for each pixel is written in the capacitor, and a non-writing period in which the signal voltage is not written in the capacitor, the period in which the data line is not supplied with the signal voltage corresponding to the video signal received from outside is the non-writing period, and the non-writing period includes a first non-writing period and a second non-writing period which are different from each other, the first non-writing period being a period in which the voltage of the first electrode supplied with the predetermined inspection current is detected when the data line is precharged to the predetermined voltage supplied from the voltage generation circuit, and the second non-writing period being a period in which the voltage of the first electrode supplied with the predetermined inspection current is detected when the data line is precharged further to another voltage supplied from the voltage generation circuit.

According to the present aspect of the invention, the non-writing period may include a first writing period and a second writing period which are different from each other, wherein during the first writing period, the voltage of the first electrode supplied with the predetermined inspection current is detected when the data line is precharged to the predetermined voltage supplied from the voltage generation circuit, and during the second writing period, the voltage of the first electrode supplied with the predetermined inspection current is detected when the data line is precharged further to another voltage supplied from the voltage generation circuit.

According to yet another aspect of the present disclosure, the display device includes pixel units each of which includes the luminescence element and the driving element, wherein the pixel units are disposed in rows and columns.

According to the present aspect of the invention, the display device may have pixel units, each of which includes the luminescence element and the driving element and which are disposed in rows and columns.

According to still another aspect of the present disclosure, the first electrode of the luminescence element is an anode electrode, and a voltage of the first power line is higher than a voltage of the second power line, so that a current flows from the first power line to the second power line.

According to the present aspect, the first electrode of the luminescence element may be an anode of the luminescence element, and a voltage of the first power line may be higher than a voltage of the second power line, to which a current flows from the first power line.

According to another embodiment of the present disclosure, a method for controlling a display device is provided. The display device includes: a luminescence element; a first power line electrically connected to a first electrode of the luminescence element; a second power line electrically connected to a second electrode of the luminescence element; a capacitor which holds a voltage; a driving element which is provided between the first electrode and the first power line and which causes the luminescence element to emit light, by passing a current between the first power line and the second power line, the current corresponding to the voltage held by the capacitor; a data line through which a signal voltage is supplied to one of electrodes of the capacitor; a first switching element which causes the capacitor to hold a voltage corresponding to the signal voltage; a voltage generation circuit which supplies the signal voltage to the data line and supplies a predetermined voltage to the data line to precharge the data line to the predetermined voltage; a current generation circuit which is connected to the data line and supplies a predetermined inspection current to the luminescence element; a voltage detection circuit which is connected to the data line and detects a voltage of the luminescence element; a connection line disposed between the first electrode and the data line; and a second switching element disposed on the connection line, which connects the first electrode and the data line. The method comprises: (i) turning off the first switching element to turn off the driving element; (ii) turning on the second switching element; (iii) causing the voltage generation circuit to supply the predetermined voltage to the data line to precharge the data line to the predetermined voltage; (iv) causing the current generation circuit to supply the predetermined inspection current to the luminescence element plural times through the precharged data line and the connection line; (v) causing the voltage detection circuit to detect plural times through the data line and the connection line the voltage of the first electrode supplied with the predetermined inspection current, and (vi) causing the voltage generation circuit to supply the data line with an updated voltage that is higher than the predetermined voltage, to precharge the data line further to the updated voltage when a difference in value of the voltage of the first electrode detected plural times is equal to or larger than a predetermined value.

According to another embodiment of the present disclosure, a display device includes: a luminescence element; a first power line electrically connected to a first electrode of the luminescence element; a second power line electrically connected to a second electrode of the luminescence element; a capacitor which holds a voltage; a driving element which is provided between the first electrode and the first power line and which causes the luminescence element to emit light, by passing a current between the first power line and the second power line, the current corresponding to the voltage held by the capacitor; a data line through which a signal voltage is supplied to one of electrodes of the capacitor; a first switching element which causes the capacitor to hold a voltage corresponding to the signal voltage; a current generation circuit which is connected to the data line and supplies a predetermined inspection current to the luminescence element; a read line which reads a voltage of the first electrode; a voltage generation circuit which supplies the signal voltage to the data line and supplies a predetermined voltage to the read line to precharge the data line to the predetermined voltage; a voltage detection circuit which is connected to the read line and detects the voltage of the first electrode; a first connection line disposed between the first electrode and the data line; a second switching element disposed on the first connection line, which connects the first electrode and the data line; a second connection line disposed between the first electrode and the read line; a third switching element disposed on the second connection line, which connects the first electrode and the read line; a fourth switching element which connects the voltage generation circuit and either the data line or the read line; and a control unit configured to (i) turn off the first switching element to turn off the driving element, (ii) cause the fourth switching element to connect the voltage generation circuit and the read line, (iii) turn on the second switching element and the third switching element, (iv) cause the voltage generation circuit to supply the predetermined voltage to the read line to precharge the read line to the predetermined voltage, (v) cause the current generation circuit to supply the predetermined inspection current to the luminescence element through the data line and the first connection line, and (vi) cause the voltage detection circuit to detect through the data line and the second connection line the voltage of the first electrode supplied with the predetermined inspection current.

According to the present aspect of the invention, the fourth switching element is caused to connect the voltage generation circuit and the data line, the voltage generation circuit is caused to supply a predetermined voltage to the data line to precharge the data line to the predetermined voltage, the current generation circuit is caused to supply a predetermined inspection current to the luminescence element through the data line, the fourth switching element is caused to connect the voltage detection circuit and the data line, and the voltage detection circuit is caused to detect through the data line a voltage of the first electrode of the luminescence element supplied with the predetermined inspection current. The data line is thus supplied with the predetermined voltage and precharged thereto so that distributed capacity connected to the data line becomes charged to a predetermined set voltage, before the inspection current flows through the luminescence element. This can drastically shorten the charging time required until the voltage of the first electrode of the luminescence element is detected after passing the inspection current to the luminescence element. Video signals can therefore be correctly compensated at high speeds according to the characteristics of the luminescence element which deteriorate over time.

Furthermore, the voltage detection circuit detects the voltage of the luminescence element via the read line which is separate from the data line. The fourth switching element, which connects the voltage generation circuit and either the data line or the read line, is provided, and when precharging the data line to the voltage, the fourth switching element is caused to connect the voltage generation circuit and the data line, while, when detecting the voltage of the luminescence element supplied with the predetermined inspection current, the fourth switching element is caused to connect the voltage detection circuit and the data line.

Preferred embodiments of the present invention are hereinafter described on the basis of the drawings. Elements which are common or equivalent among all the drawing are hereinafter denoted by the same symbol, and thus a description thereof is omitted.

First Embodiment

FIG. 1 is a state diagram of a display unit of a generally-used active-matrix type display device. FIG. 1 shows writing and non-writing periods for each pixel row (line) with respect to a certain pixel column. The vertical axis represents the pixel row, and the horizontal axis represents elapsed time. Here, the writing period indicates a period in which a data line is used to supply a signal voltage to each pixel. In this writing period, operations to write the signal voltage are performed in an order of the pixel rows. In the pixel circuit of the present display device, voltage retention into a capacitance element is performed at the same time as voltage application to a gate of a driving transistor during the writing period, with the result that this writing operation is followed by light emission.

To accurately measure current-voltage characteristics of the organic EL elements degraded over time, the conventional display devices, which each have a pixel circuit with a large parasitic capacitor, require a long charge time to read voltages of the organic EL elements by allowing electric currents to flow through the pixel circuits. This makes it impossible to check the above current-voltage characteristics during the writing period and light emission period as shown in FIG. 1, which leads to the need to provide a separate period for inspecting the current-voltage characteristics from the writing period and the light emission period.

In a display device and a method for controlling the same according to the first embodiment of the present invention, even while video signals are outputted to the display device, the current-voltage characteristic of the organic EL elements can be inspected during the non-writing period in which the data lines are not used. This eliminates the need to set a separate period for calculating the current-voltage characteristics of the organic EL elements, from the period in which the video signals are outputted to the display device, and allows for simultaneous output of the video signals to the display device with prompt and adaptive correction of the video signals for the characteristics of organic EL elements which deteriorate over time.

The following shall describe with reference to the drawings that the display device according to the first embodiment of the present invention can accurately detect the current-voltage characteristics of the organic EL elements at high speeds even during the non-writing period.

Figure 2:
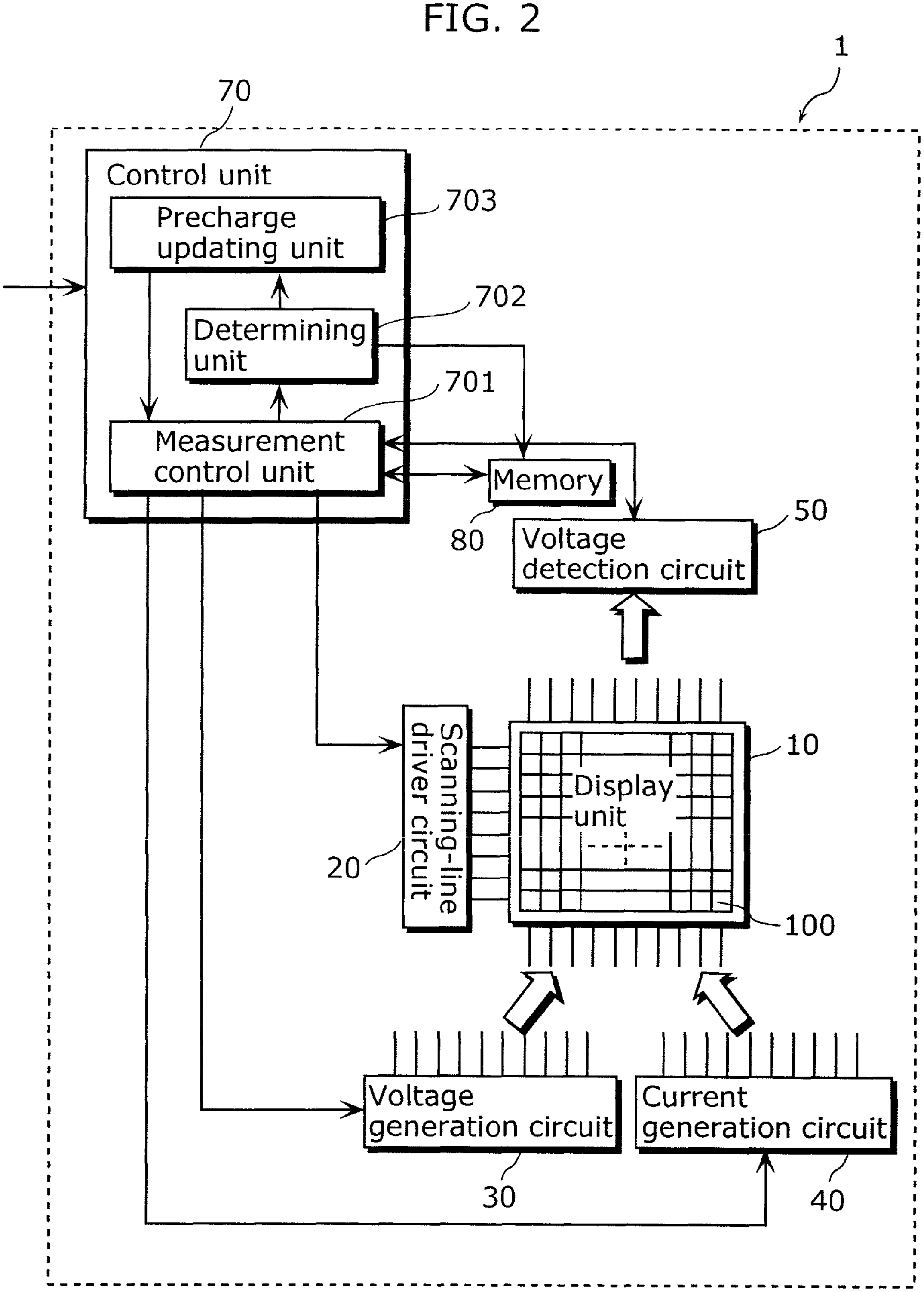
FIG. 2 is a functional configuration diagram which shows a display device according to a first embodiment of the present invention.

FIG. 2 is a functional configuration diagram which shows the display device according to the first embodiment of the present invention. The display device 1 in FIG. 2 includes a display unit 10, a scanning-line driver circuit 20, a voltage generation circuit 30, a current generation circuit 40, a voltage detection circuit 50, a control unit 70, and a memory 80.

Figure 3:
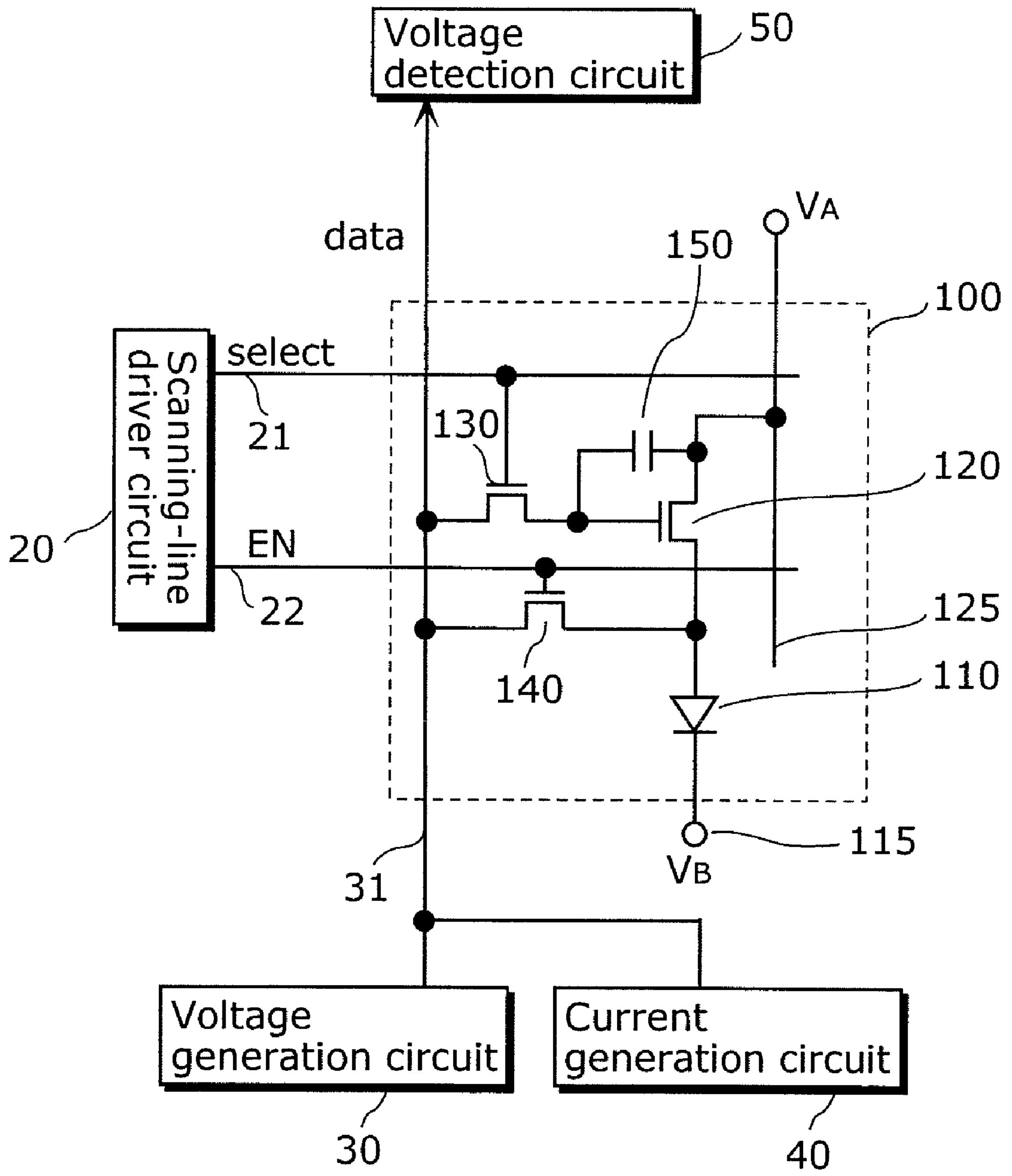
FIG. 3 is a diagram which shows a circuitry configuration of a pixel unit of a display unit according to the first embodiment of the present invention, and connection of the pixel unit with peripheral circuitry thereof.

FIG. 3 is a diagram which shows a circuitry configuration of a pixel unit of the display unit according to the first embodiment of the present invention, and connection of the pixel unit with peripheral circuitry thereof. A pixel unit 100 in FIG. 3 includes an organic EL element 110, a driving transistor 120, a switching transistor 130, a test transistor 140, a capacitance element 150, a common electrode 115, a power line 125, a scanning line 21, a control line 22, and a data line 31. The peripheral circuitry includes the scanning-line driver circuit 20, a voltage generation circuit 30, the current generation circuit 40, and the voltage detection circuit 50.

First described are functions of the elements shown in FIG. 2.

The display unit 10 is composed of a plurality of the pixel units 100.

The scanning-line driver circuit 20 is connected to the scanning line 21 and the control line 22 and has a function of controlling conduction and non-conduction of the switching transistor 130 and the test transistor 140 of each of the pixel units 100 by adjusting voltage levels of the scanning line 21 and the control line 22, respectively.

The voltage generation circuit 30 is connected to the data line 31 and functions as a data line driving circuit for providing a signal voltage to the data line 31. The voltage generation circuit functions as a voltage source which provides a predetermined voltage to precharge the data line 31. Further, the voltage generation circuit 30 has a switch which is capable of opening and closing the connections to the data line 31.

Herein, "precharge" means charging a given circuit in advance. In the present embodiment, the display unit 10 has a thin film stacked structure having various circuit elements and accordingly, for example, the data line 31 has a parasitic capacitor at an intersection of the scanning line and the power line for each pixel. In the case where a minute electrical current is allowed to flow through the data line 31 having the parasitic capacitor, charges need to be retained also in the parasitic capacitor so that the data line 31 comes to a steady state by the minute electrical current. In addition, it takes a long time to accumulate charges in the parasitic capacitor.

Thus, "precharge" in the present embodiment means that the voltage generation circuit 30 charges the data line 31 by voltage application in order to accumulate charges in the parasitic capacitor in advance.

The data line 31, which is the second conductive line, is connected to a pixel column which includes the pixel units 100, and the signal voltage provided by the voltage generation circuit 30 is provided for each of the pixel units of the pixel column through the data line 31. The current generation circuit 40 is connected to the data line 31, and functions as a current source for allowing an inspection current to flow through the organic EL element 110. Further, the voltage generation circuit 30 has a switch which is capable of opening and closing the connections to the data line 31.

Herein, "inspection current" means an electrical current which is allowed to flow through the organic EL element 110 in order to accurately assess the time-degradation situation of the organic EL element 110 at high speeds. An anode voltage of the organic EL element 110 generated by the inspection current flowing through the organic EL element 110 is detected by the voltage detection circuit 50, and the present current-voltage characteristic of the organic EL element 110 can be thus obtained.

The voltage detection circuit 50 is connected to the data line 31 and has a function of detecting an anode voltage of the organic EL element 110 when the test transistor 140 is conductive.

The voltage detection circuit 50 may be incorporated in a data driver IC with the voltage generation circuit 30 or provided externally to the data driver IC.

Figure 4:
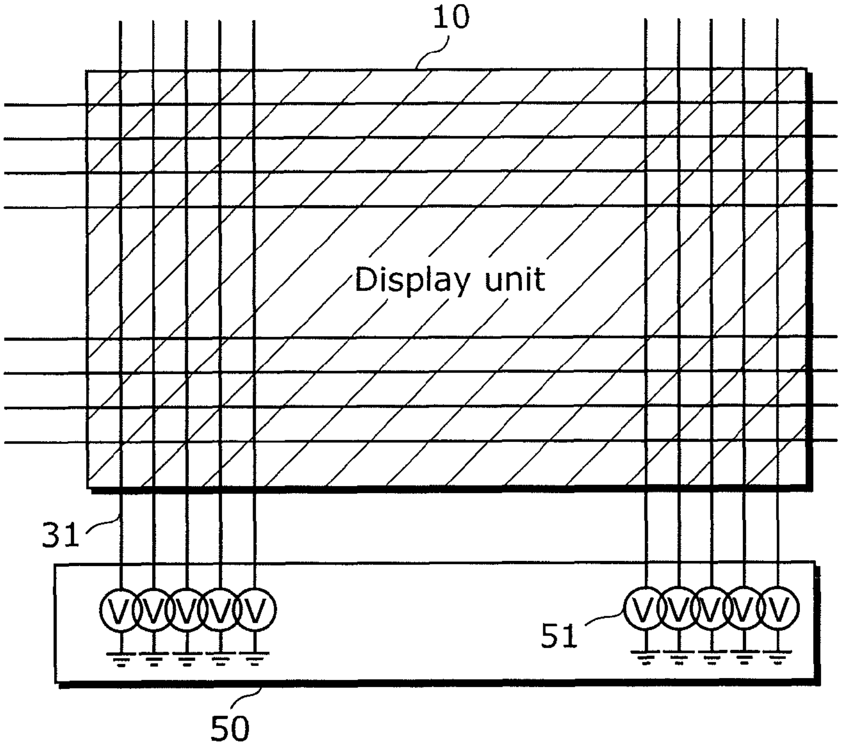
FIG. 4 is a diagram which shows a first configuration of a voltage detection circuit of the display device according to the first embodiment of the present invention.

FIG. 4 is a diagram which shows a first configuration of the voltage detection circuit of the display device according to the first embodiment of the present invention. The voltage detection circuit 50 may have a plurality of voltage detection units 51 as many as a plurality of the data lines 31 as shown in FIG. 4.

Figure 5:
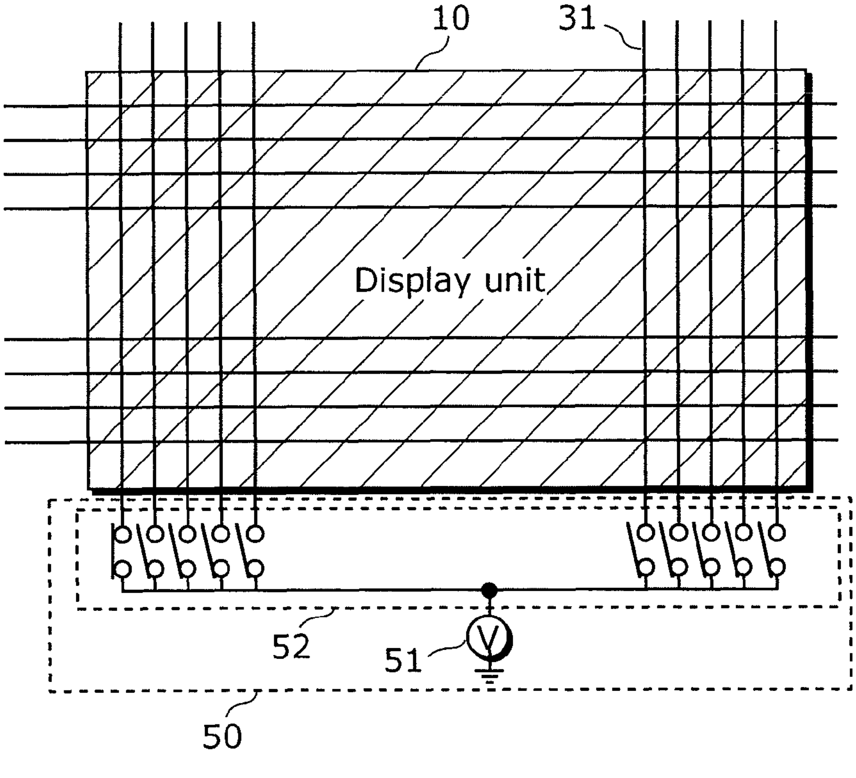
FIG. 5 is a diagram which shows a second configuration of the voltage detection circuit of the display device according to the first embodiment of the present invention.

FIG. 5 is a diagram which shows a second configuration of the voltage detection circuit of the display device according to the first embodiment of the present invention. The voltage detection circuit 50 preferably has a multiplexer 52, which switches between the data lines 31, and the voltage detection units 51 fewer than the data lines 31 as shown in FIG. 5. This configuration reduces the number of the voltage detection units 51 necessary for measurement of the anode voltage of the organic EL element 110, thus the area for an electronic device or the number of parts is reduced.

Figure 6:
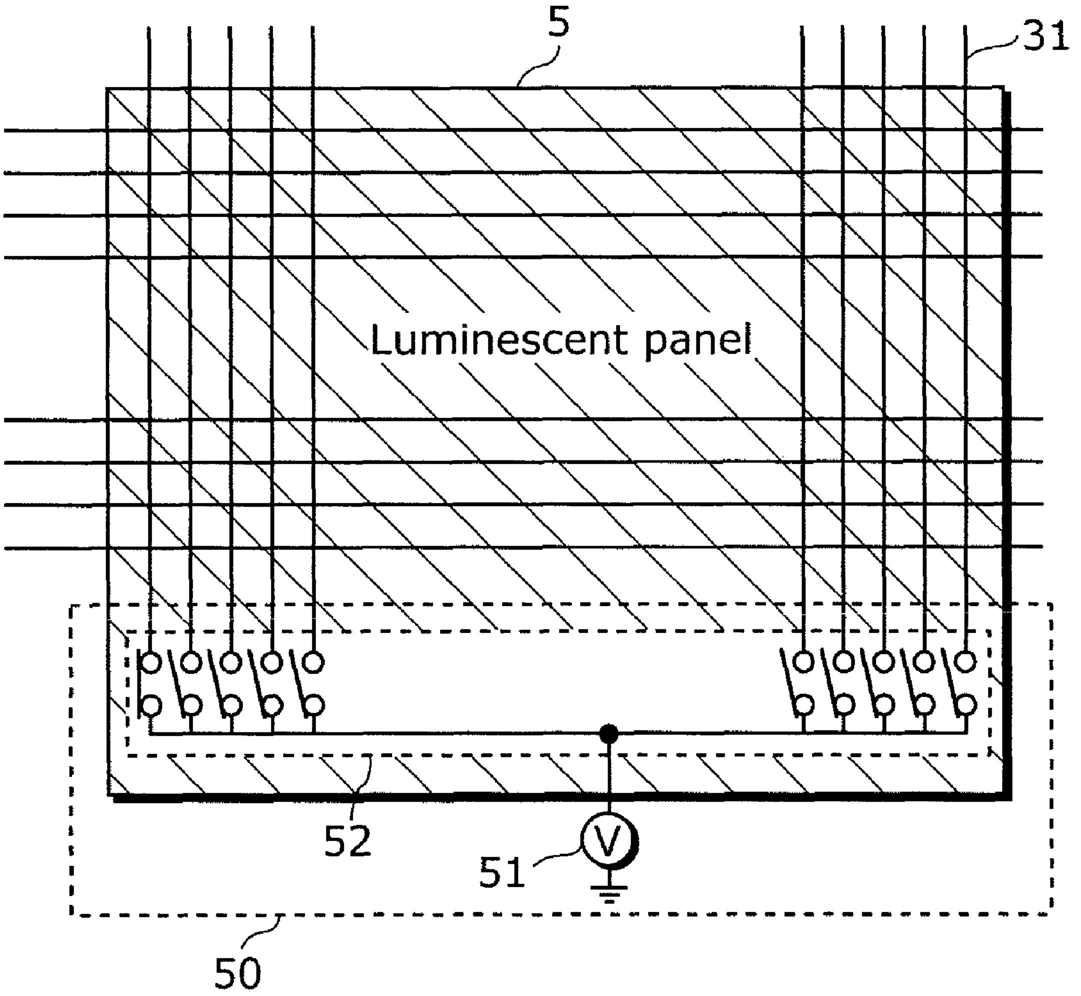
FIG. 6 is a diagram which shows a third configuration of the voltage detection circuit of the display device according to the first embodiment of the present invention.

FIG. 6 is a diagram which shows a third configuration of the voltage detection circuit of the display device according to the first embodiment of the present invention. As shown in FIG. 6, the multiplexer 52 may be formed on a luminescent panel 5 in the case where the voltage detection circuit 50 has the multiplexer 52, which switches between the data lines 31, and the voltage detection units 51 fewer than the data lines 31. This configuration reduces the scale of the voltage detection circuit, thus the display device can be manufactured less costly.

The control unit 70 has a function of controlling the scanning-line driver circuit 20, the voltage generation circuit 30, the current generation circuit 40, and the voltage detection circuit 50, and the memory 80. Moreover, the control unit 70 includes a measurement control unit 701, a determining unit 702, and a precharge updating unit 703.

The measurement control unit 701 makes the test transistor 140 conductive, thereby causing the voltage generation circuit 30 to precharge the data line 31. And then, the anode voltage of the organic EL element 110 is measured by the voltage detection circuit 50 while the current generation circuit 40 applies a current to the organic EL element 110. Afterward, the measured anode voltage of the organic EL element 110 is outputted to the determining unit 702.

The determining unit 702 determines whether or not the anode voltage of the organic EL element 110 measured by the voltage detection circuit 50 is stable. A result of the determination is then outputted to the precharge updating unit 703. A method for determining the stability of the anode voltage of the organic EL element 110 and a standard thereof will be described later with reference to FIG. 8.

When the determining unit 702 determines that the anode voltage of the organic EL element 110 is not stable, the precharge updating unit 703 updates conditions under which the data line 31 is precharged by the voltage generation circuit 30. A method for updating the precharge and setting thereof will be described later with reference to FIG. 8.

Further, the control unit 70 converts the current-voltage characteristic data of the organic EL element 110, which is obtained by the above construction, into digital data, and carries out operations to calculate a characteristic parameter. The characteristic parameter thus calculated is then written into the memory 80. After writing the characteristic parameter into the memory 80, the control unit 70 reads out the characteristic parameter from the memory 80, uses it to correct video signal data which is inputted from outside, and outputs the corrected data to the voltage generation circuit 30 having a function as a data line driving circuit. This compensates for unevenness in the light emission efficiencies of the organic EL elements of the respective pixel units, which reduces uneven luminance.

Next, a configuration of internal circuitry of the pixel unit 100 is described with reference to FIG. 3.

The organic EL element 110, which functions as a luminescence element, emits light depending on the source-drain current provided from the driving transistor 120. The organic EL element 110 has a cathode, which is a second electrode thereof, is connected to the common electrode 115 and usually grounded.

The driving transistor 120 has a gate which is connected to the data line 31 via the switching transistor 130, and a source and a drain one of which is connected to the anode which is a first electrode of the organic EL element 110 and the other of which is connected to the power line 125.

This circuit connection allows the signal voltage provided by the voltage generation circuit 30 to be applied to the gate of the driving transistor 120 via the data line 31 and the switching transistor 130. Then source-drain current corresponding to the signal voltage applied to the gate of the driving transistor 120 flows into the organic EL element 110 from the anode of the organic EL element 110.

The switching transistor 130 has a gate which is connected to the scanning line 21, and a source and a drain one of which is connected to the data line 31 and the other one of which is connected to the gate of the driving transistor 120. Here, the switching transistor 130 is turned on when the voltage level of the scanning line 21 becomes high, and then the signal voltage is applied to the gate of the driving transistor 120.

The test transistor 140 is a switching element which forms a voltage path for measuring the anode voltage of the organic EL element 110 through the data line 31. The test transistor 140 has a gate which is connected to the control line 22, and a source and a drain one of which is connected to the anode of the organic EL element 110 and the other one of which is connected to the data line 31. Here, the test transistor 140 is turned on when the voltage level of the control line 22 becomes high, and the anode voltage of the organic EL element 110 is detected by the voltage detection circuit 50 via the data line 31.

The capacitance element 150 has terminals one of which is connected to the gate of the driving transistor 120 and the other one of which is connected to one of the source and the drain of the driving transistor 120. During the light emission, the capacitance element 150 holds the signal voltage provided for the gate of the driving transistor 120 and therefore, a source-drain current corresponding to the signal voltage flows.

Although not shown in FIGS. 2 and 3, all the power lines 125 are connected to one power source. Further, the common electrode 115 is also connected to the power source.

Hereinafter, a method for controlling the display device 1 according to the first embodiment of the present invention is described. This control method allows to detect the characteristic of the organic EL element 110.

Figure 7:
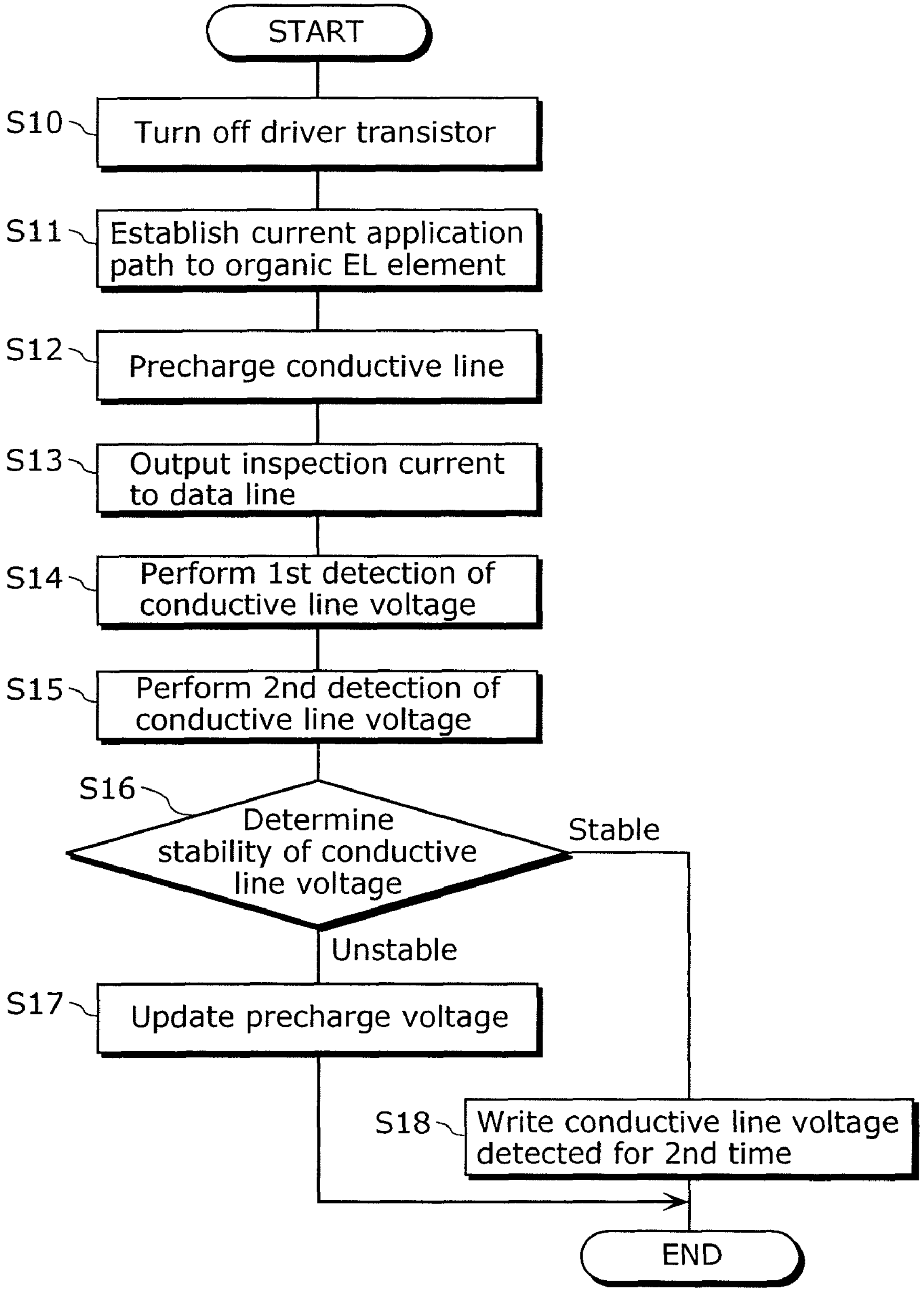
FIG. 7 is an operation flowchart which shows the operations of a control unit according to the first and second embodiments of the present invention, for detecting a current-voltage characteristic of an organic EL element.

FIG. 7 is an operation flowchart which shows the operations of the control unit according to the first embodiment of the present invention, for detecting the current-voltage characteristic of the organic EL element.

At the beginning, the measurement control unit 701 causes the voltage generation circuit 30 to output a voltage for turning off the driving transistor 120, writes the voltage into the capacitance element 150, and then turns the driving transistor 120 off (S10).

Next, the measurement control unit 701 turns on the test transistor 140 by ON voltage application from the scanning-line driver circuit 20 to the control line 22 so that a current application path to the organic EL element 110 is established (S11).

Subsequently, the measurement control unit 701 causes the voltage generation circuit 30 to provide a precharge voltage, which is set in advance, to the data line 31, which is a conductive line, so that the connection lines which extend to the organic EL element 110 are precharged to the voltage (S12).

Here, the precharge voltage is an estimated voltage for contributing to high-speed voltage convergence in the data line 31, which occurs in the following step in which the current generation circuit 40 flows an inspection current through the data line 31. The value of precharge voltage is therefore set by taking into account a parasite capacitance value and an inspection current value of the data line 31.

Next, the measurement control unit 701 causes the current generation circuit 40 to output the inspection current to the data line 31 (S13). At this time, there is no output from the voltage generation circuit 30.

Subsequently, the measurement control unit 701 causes the voltage detection circuit 50 to perform the first detection of a conductive line voltage (S14). The measurement control unit 701 then outputs the result to the determination unit 702.

After a predetermined length of time after Step S14, the measurement control unit 701 causes the voltage detection circuit 50 to perform the second detection of a conductive line voltage (S15). The measurement control unit 701 then outputs the result to the determination unit 702. Here, the conductive line voltage in Step S14 and Step S15 indicates a voltage on the data line 31.

Next, the determination unit 702 determines whether or not a difference between the above two conductive line voltages obtained from the measurement control unit 701 is equal to or greater than a predetermined value (S16).

Finally, when it is determined in Step S16 that the difference between the conductive line voltages is equal to or greater than the predetermined value ("unstable" in S16), the determination unit 702 determines that the measurement of the conductive line voltages is unstable, and the precharge updating unit 703 updates the precharge voltage (S17). At the time of next current-voltage characteristic measurement, a series of the sequence starting from Step S10 is carried out again. It is to be noted that in this case, the updated precharge voltage is, for example, the conductive line voltage detected for the second time in Step S15.

On the other hand, when it is determined in Step S16 that the difference between the conductive line voltages is smaller than the predetermined value ("stable" in S16), the determination unit 702 determines that the measurement of the conductive line voltages is stable, and the memory 80 stores, as a voltage value for the above inspection current, the conductive line voltage detected for the second time in Step S15 (S18).

It is to be noted that the conductive line voltages detected in Step S14 and Step S15 by the voltage detection circuit 50 for the first and second times may be stored from measurement control unit 701 to the memory 80 and not via the determination unit 702. In this case, in Step S16, the determination unit 702 carries out the above determination by reading the above two conductive line voltages from the memory 80.

Although the detection of the conductive line voltage is carried out twice through Step S14 and Step S15 in the above evaluation method of the current-voltage characteristic of the organic EL element, the measurement control unit 701 may cause the detection of the conductive line voltage three times or more so that the determination unit 702 determines voltage stability based on the three or more voltage values thus detected.

The following shall explain the timing of electric signals as indicated by the operation flowchart shown in FIG. 7.

Figure 8:
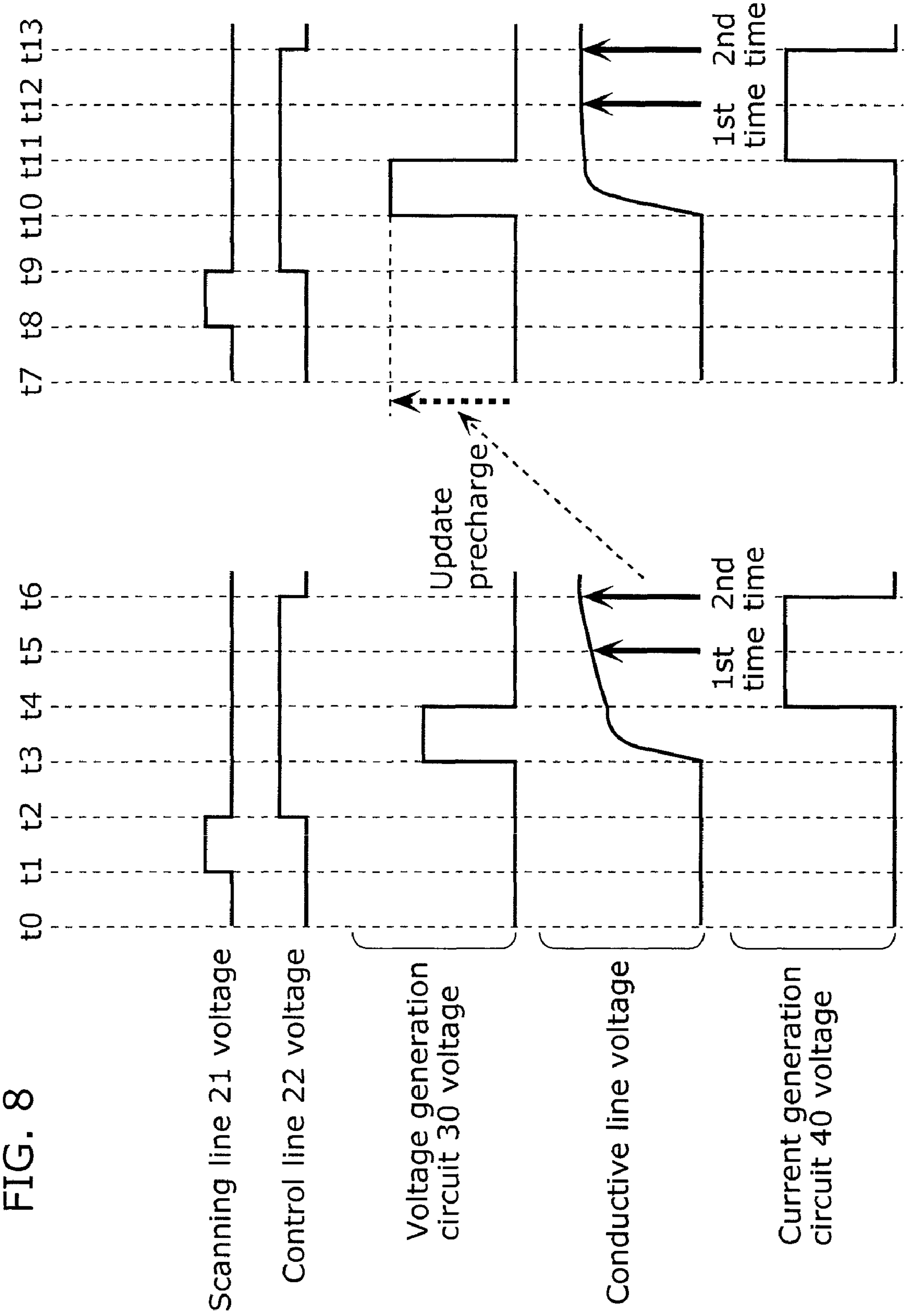
FIG. 8 is a timing chart for detecting the current-voltage characteristic of the organic EL element according to the first embodiment of the present invention.

FIG. 8 shows a timing chart for detecting the current-voltage characteristic of the organic EL element according to the first embodiment of the present invention. FIG. 8 illustrates one example of the above-described non-writing period of FIG. 1, indicating that within the non-writing period of FIG. 1, the steps at T1 to T6 of FIG. 8 are carried out, for example. After the above steps are carried out, the precharge in the steps at T7 to T13 of FIG. 8 may further be carried out if there remains enough time within the non-writing period.

In FIG. 8, the horizontal axis represents time. Along the vertical axis, FIG. 8 shows in sequence a waveform of voltage on the scanning line 21, a waveform of voltage on the control line 22, a waveform of the voltage provided by the voltage generation circuit 30, a waveform of the conductive line voltage, and a waveform of the current generated by the current generation circuit 40. The arrows in FIG. 8 indicate timing of the voltage detection. In the first embodiment, the conductive line voltage stated in FIG. 8 indicates a voltage on the data line 31.

At the beginning, at a time t0, the data line 31 is set to have a voltage for turning off the driving transistor 120.

Next, at a time t1, a voltage level of the scanning line 21 becomes such that the switching transistor 130 is turned on. At this time, the driving transistor 120 is turned off. This means that the source-drain current of the driving transistor 120 will not flow through the organic EL element 110. The operation at the time t0 and the time t1 corresponds to Step S10 of FIG. 7.

Figure 9A:
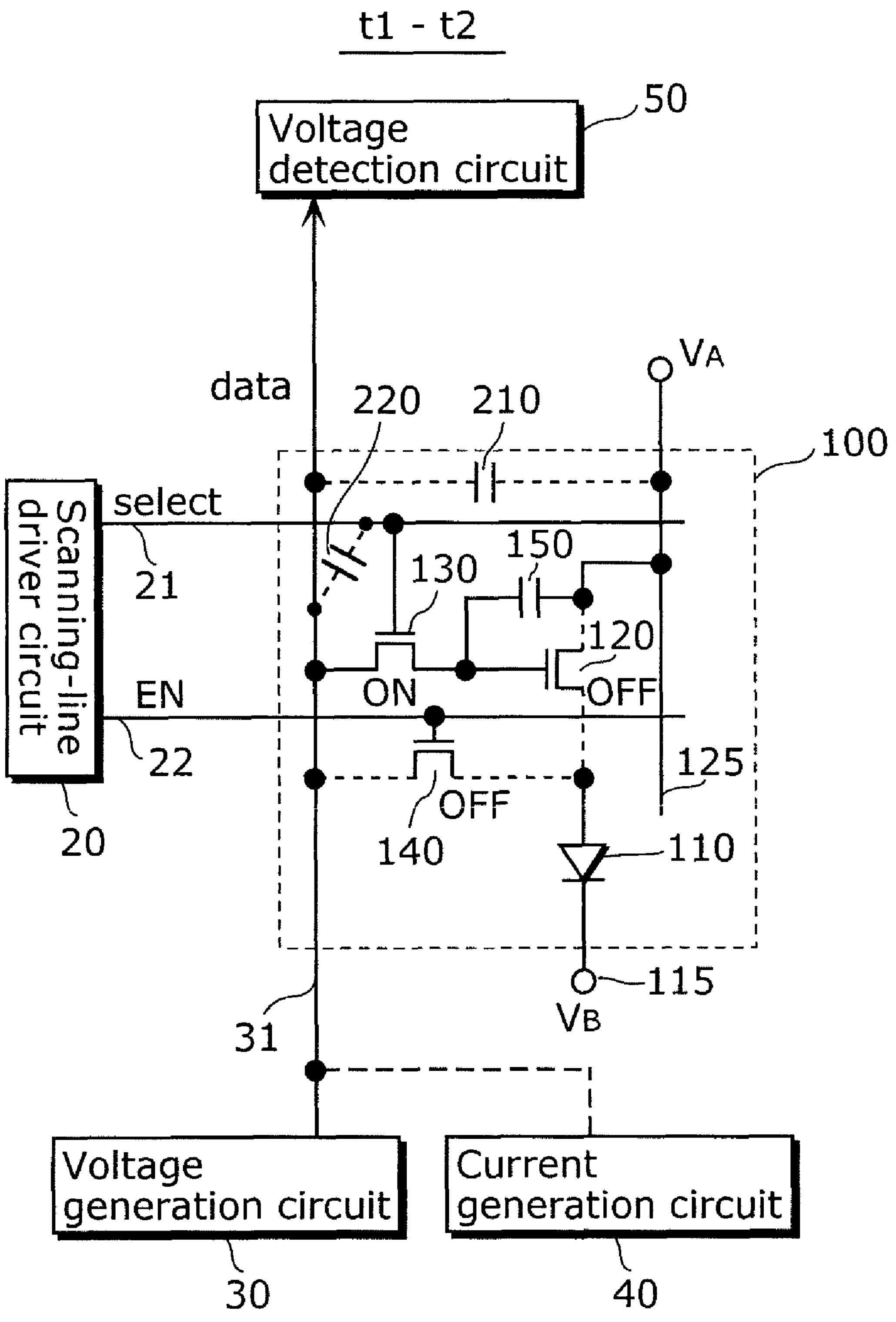
FIG. 9A is a circuit diagram which shows operations of the display device according to the first embodiment of the present invention from a time t1 to a time t2.

FIG. 9A is a circuit diagram which shows operations of the display device according to the first embodiment of the present invention from the time t1 to a time t2.

FIGS. 9A to 9D each show, in addition to the circuitry configuration of the pixel unit 100, a parasite capacitor 220 formed between the data line 31 and the scanning line 21, and a parasite capacitor 210 formed between the data line 31 and the power line 125 which is commonly used among the pixel units 100 inside the display unit 10.

Next, at the time t2, a voltage level of the scanning line 21 becomes such that the switching transistor 130 is turned off. At the same time, a voltage level of the control line 22 becomes such that the test transistor 140 is turned on. This provides a current path through which a current can be supplied from the data line 31 to the organic EL element 110. The operation at the time t2 corresponds to Step S11 of FIG. 7.

Figure 9B:
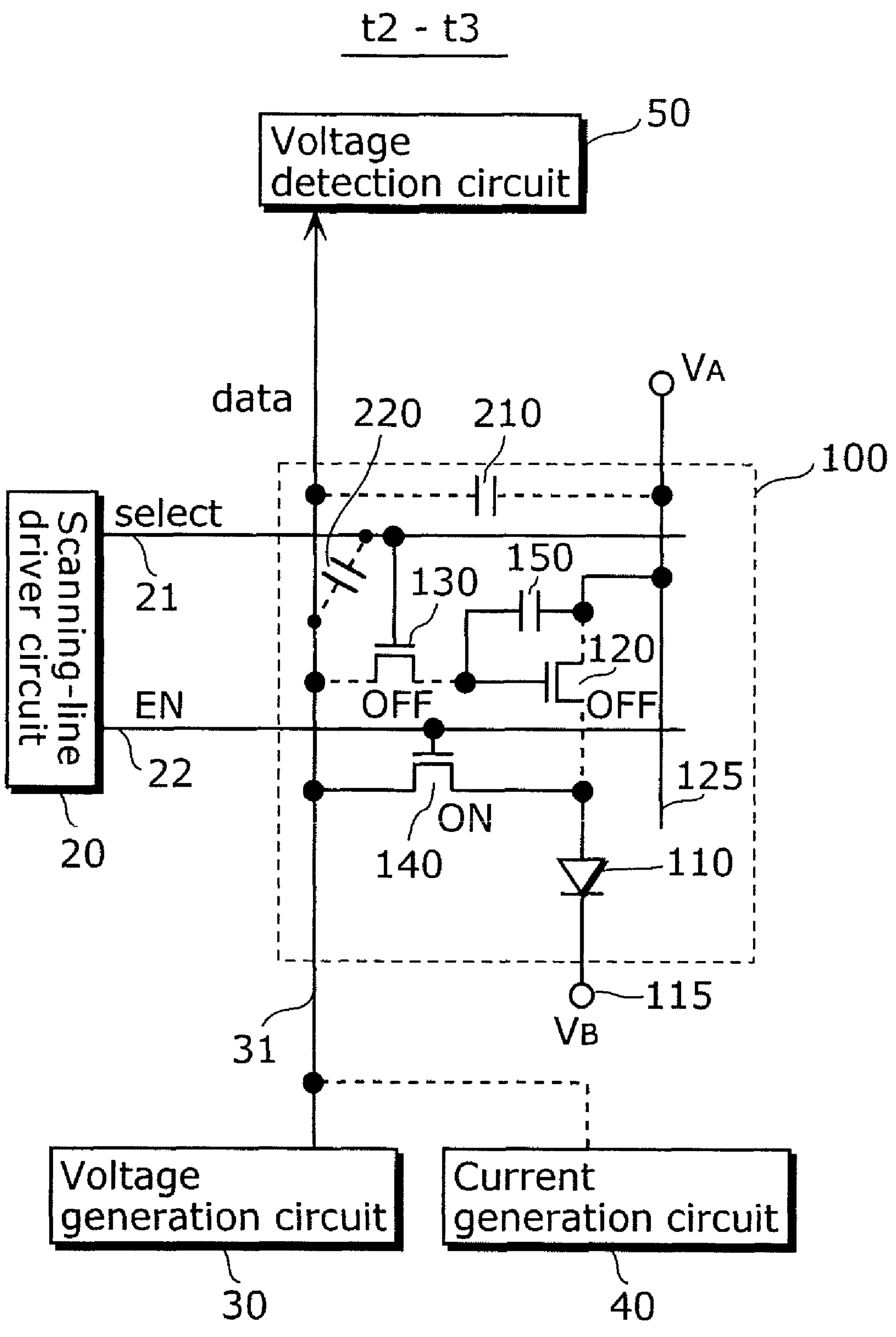
FIG. 9B is a circuit diagram which shows operations of the display device according to the first embodiment of the present invention from the time t2 to a time t3.

FIG. 9B is a circuit diagram which shows operations of the display device according to the first embodiment of the present invention from the time t2 to a time t3.

Next, at the time t3, the voltage generation circuit 30 provides the precharge voltage, which is set in advance, to the data line 31. At this time, the precharge is performed on the data line 31. The operation at the time t3 corresponds to Step S12 of FIG. 7.

Figure 9C:
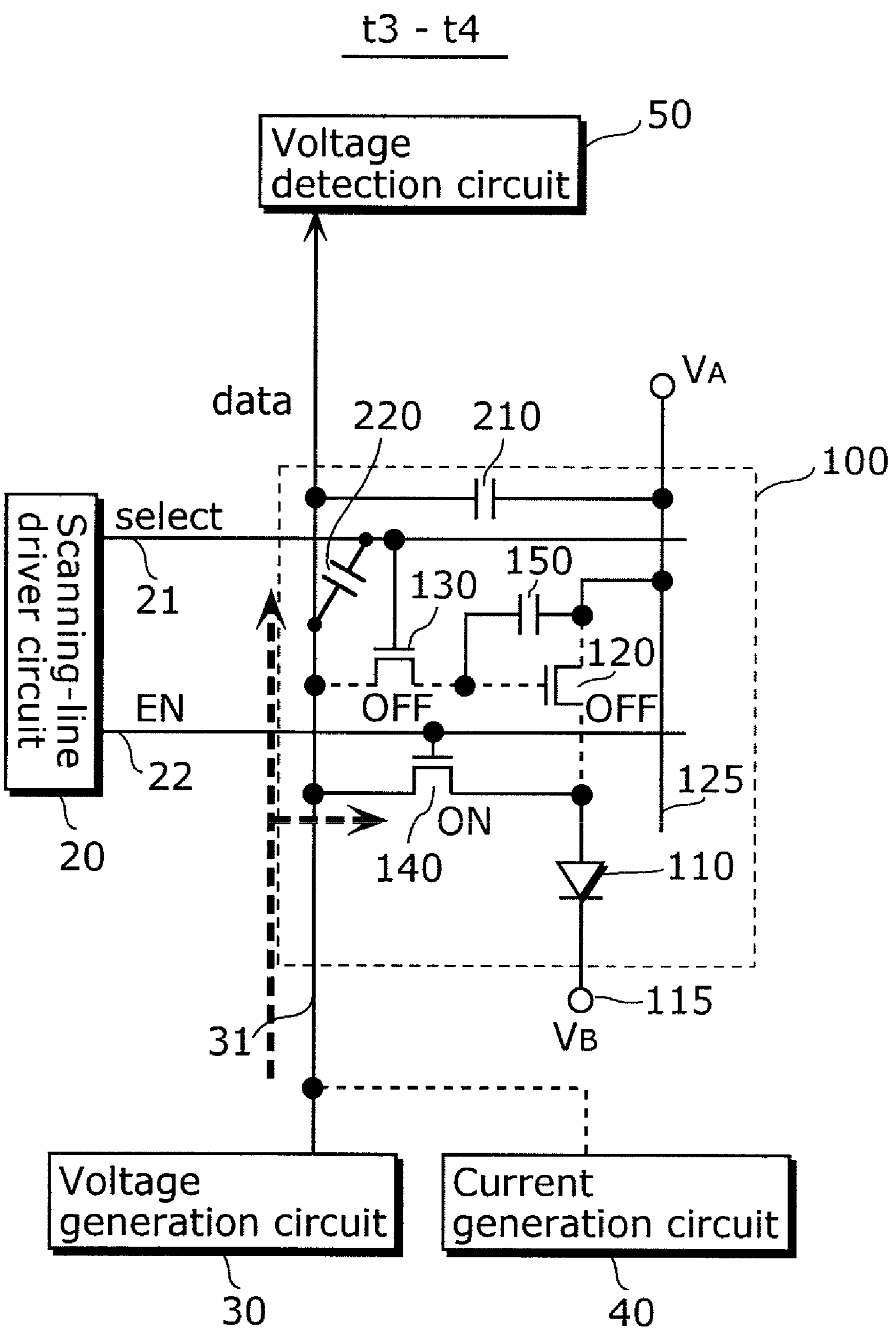
FIG. 9C is a circuit diagram which shows operations of the display device according to the first embodiment of the present invention from the time t3 to a time t4.

FIG. 9C is a circuit diagram which shows operations of the display device according to the first embodiment of the present invention from the time t3 to a time t4. As shown in FIG. 9C, the parasite capacitors 210 and 220 are charged by the above precharge on the data line 31.

Next, at the time t4, the current generation circuit 40 provides an inspection current to the organic EL element 110 through the data line 31. At the same time, the voltage generation circuit 30 stops providing a voltage. The operation at the time t4 corresponds to Step S13 of FIG. 7.

Figure 9D:
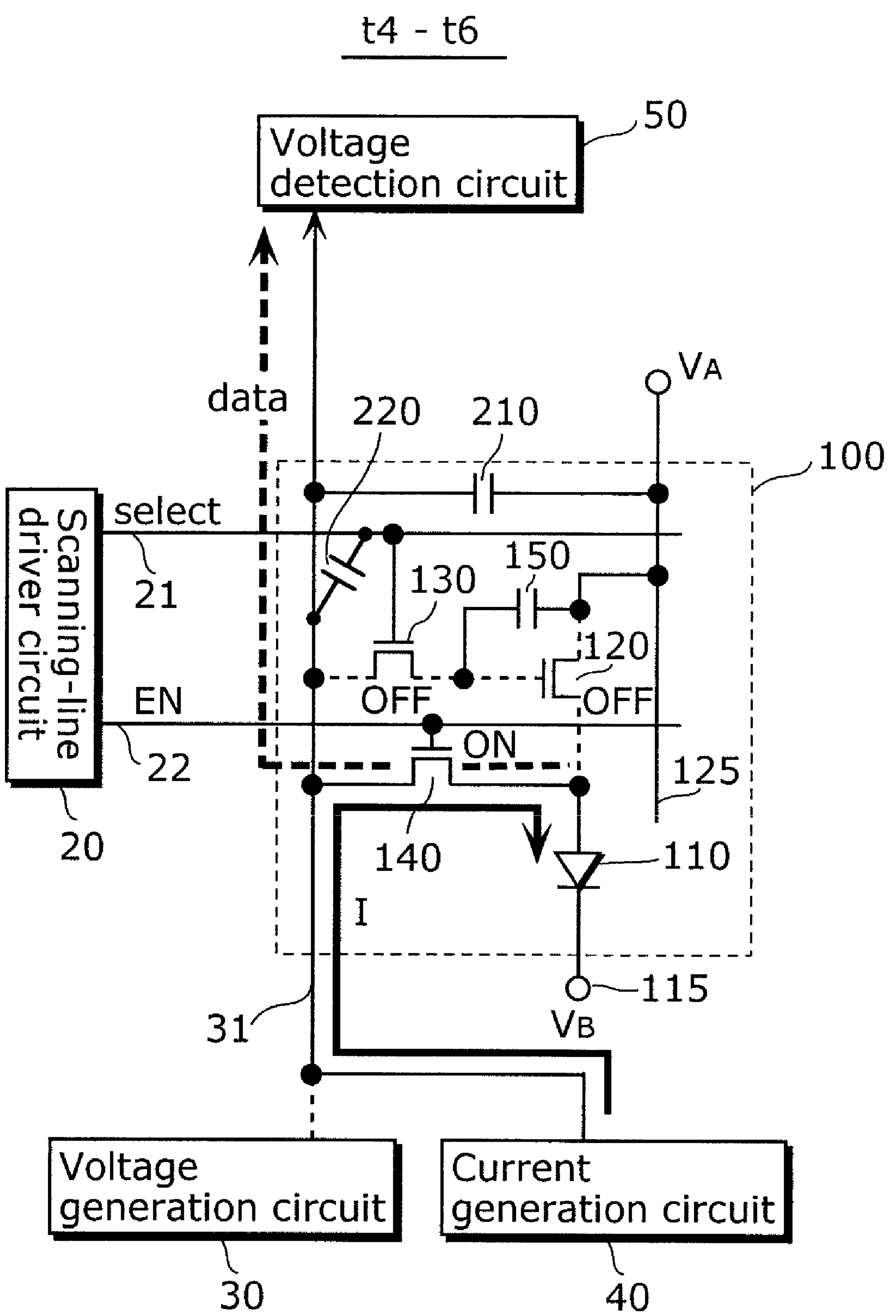
FIG. 9D is a circuit diagram which shows operations of the display device according to the first embodiment of the present invention from the time t4 to a time t6.

FIG. 9D is a circuit diagram which shows operations of the display device according to the first embodiment of the present invention from the time t4 to a time t6.

Next, at a time t5, the voltage detection circuit 50 performs the first detection of a conductive line voltage of the data line 31. The operation at the time t5 corresponds to Step S14 of FIG. 7.

Next, at the time t6, the voltage detection circuit 50 performs the second detection of a conductive line voltage of the data line 31. When the difference in value between the conductive line voltage detected for the first time and the conductive line voltage detected for the second time is equal to or greater than the predetermined voltage value, the next detection of current-voltage characteristic of the organic EL element 110 is carried out with a different precharge voltage.

Now, the following will explain the timing for next detection of current-voltage characteristic of the organic EL element 110 through a time t7 to a time t13, assuming that the difference in value between the conductive line voltage detected for the first time and the conductive line voltage detected for the second time has been equal to or greater than the predetermined voltage value.

At the time t7, the data line 31 is set to have a voltage for turning off the driving transistor 120.

Next, at a time t8, a voltage level of the scanning line 21 becomes such that the switching transistor 130 is turned on. At the time, the driving transistor 120 is turned off. This means that the source-drain current of the driving transistor 120 will not flow through the organic EL element 110.

Next, at a time t9, a voltage level of the scanning line 21 becomes such that the switching transistor 130 is turned off. At the same time, a voltage level of the control line 22 becomes such that the test transistor 140 is turned on. This provides a current path through which a current can be supplied from the data line 31 to the organic EL element 110.

Next, at a time t10, the voltage generation circuit 30 provides a voltage, which is set in advance, to the data line 31. At this time, the precharge is performed on the data line 31.

Next, at a time t11, the current generation circuit 40 provides an inspection current to the organic EL element 110 through the data line 31. At the same time, the voltage generation circuit 30 stops providing a voltage.

Next, at a time t12, the voltage detection circuit 50 performs the first detection of a conductive line voltage of the data line 31.

Next, at the time t13, the voltage detection circuit 50 performs the second detection of a conductive line voltage of the data line 31. The difference in value between the conductive line voltage detected for the first time and the conductive line voltage detected for the second time is smaller than the predetermined voltage value, and therefore the conductive line voltage detected for the second time is stored in the memory 80 as a measured anode voltage of the organic EL element 110.

In a circuit of such a size as to have data lines for corresponding pixel columns, each of which includes pixel units, as the above-described display device, the length of time for detecting the voltage of the organic EL element with the data lines precharged will be drastically shorter than the length of time required for detecting the voltage with the data lines not precharged. Owing to this reduction of time for detection, the steps of determining the stability of detected voltages and re-detecting a voltage can be fit within the allowed time period, thus allowing for accurate voltage measurement. Further, through this fast and accurate detection of current-voltage characteristic of the organic EL element, even while the luminescent panel displays video, it is possible to detect the current-voltage characteristic of the organic EL element by using the time period during which the data lines are not used. For example, the above-described steps of detecting the current-voltage characteristic of the organic EL element can be carried out within the non-writing period allocated on a per frame basis.

For example, it may be possible that Steps S10 to S16 of FIG. 7 are carried out for a predetermined non-writing period, and the same Steps S10 to S16 are carried out with an updated precharge voltage for another non-writing period.

Second Embodiment

Figure 10:
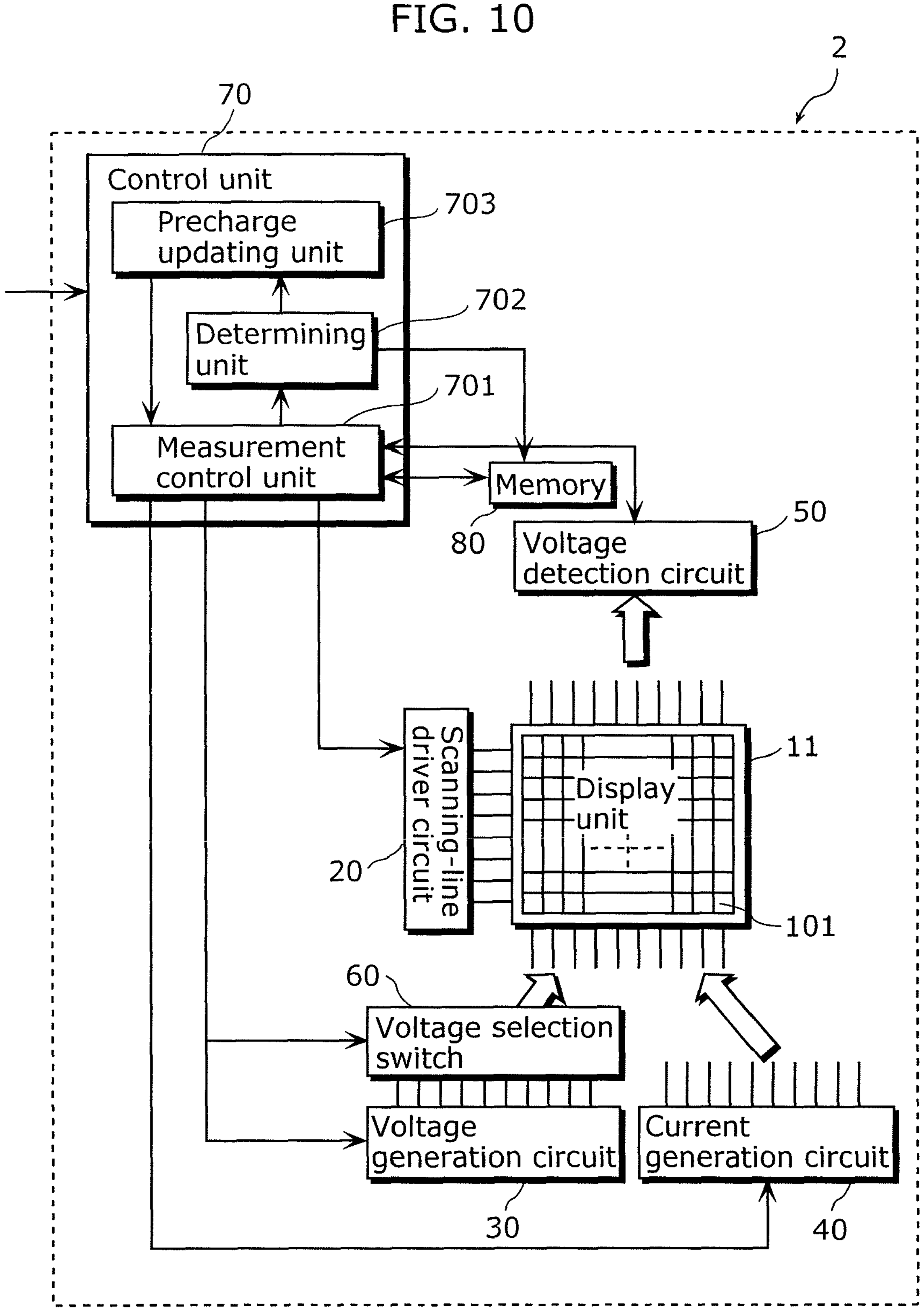
FIG. 10 is a functional configuration diagram which shows a display device according to a second embodiment of the present invention.

FIG. 10 is a functional configuration diagram which shows a display device according to the second embodiment of the present invention. The display device 2 in FIG. 10 includes a display unit 11, a scanning-line driver circuit 20, a voltage generation circuit 30, a current generation circuit 40, a voltage detection circuit 50, a voltage selection switch 60, a control unit 70, and a memory 80.

Figure 11:
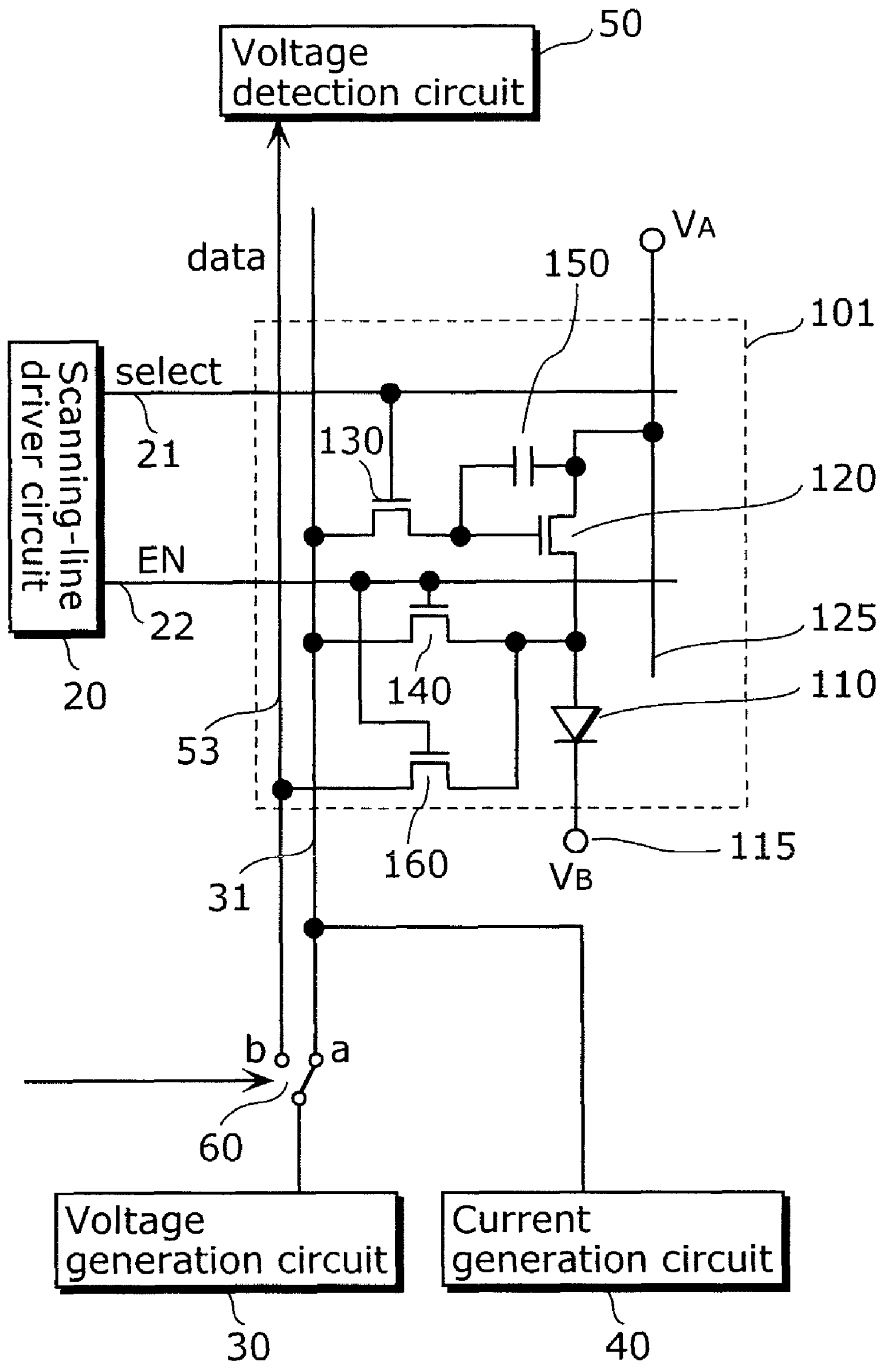
FIG. 11 is a diagram which shows a circuitry configuration of a pixel unit of a display unit according to the second embodiment of the present invention, and connection of the pixel unit with peripheral circuitry thereof.

FIG. 11 is a diagram which shows a circuitry configuration of a pixel unit of the display unit according to the second embodiment of the present invention, and connection of the pixel unit with peripheral circuitry thereof. A pixel unit 101 in FIG. 11 includes an organic EL element 110, a driving transistor 120, a switching transistor 130, a test transistor 140, a capacitance element 150, a read transistor 160, a common electrode 115, a power line 125, a scanning line 21, a control line 22, a data line 31, and a read line 53. The peripheral circuitry includes the scanning-line driver circuit 20, a voltage generation circuit 30, the current generation circuit 40, the voltage detection circuit 50, and the voltage selection switch 60.

Compared to the display device 1 according to the first embodiment, a display device 2 according to the second embodiment of the present invention is different in a configuration in which a read line 53 is provided for each pixel column and the voltage selection switch 60 is provided which is used for selecting a connection of the read line 53 with the voltage generation circuit 30 or a connection of the data line 31 with the voltage generation circuit 30. Compared to the pixel unit 100, the pixel unit 101 is different in a configuration in which the read transistor and a voltage detection path are provided. The following description refers only to differences from FIG. 1 and FIG. 2 in the first embodiment, and a description of points in common with FIG. 1 and FIG. 2 in the first embodiment is omitted.

The display unit 11 is composed of a plurality of the pixel units 101.

The scanning-line driver circuit 20 is connected to the scanning line 21 and the control line 22 and has a function of controlling conduction and non-conduction of the switching transistor 130, the test transistor 140, and the read transistor 160 of each of the pixel units 101 by adjusting voltage levels of the scanning line 21 and the control line 22, respectively.

The voltage generation circuit 30 is connected to the data line 31 or the read line 53 via the voltage selection switch 60. The voltage generation circuit 30 connected to the data line 31 functions as a data line driving circuit for providing a signal voltage to the data line 31. The voltage generation circuit 30 connected to the read line 53 functions as a voltage source which provides a predetermined voltage to precharge the read line 53 to the predetermined voltage. Further, the voltage generation circuit 30 has a switch which is capable of opening and closing the connections to the read line 53.

The data line 31, which is the second conductive line, is connected to a pixel column which includes the pixel units 101 and provides each of the pixel units of the pixel column with the signal voltage provided by the voltage generation circuit 30

The voltage detection circuit 50 is connected to the read line 53 and has a function of detecting an anode voltage of the organic EL element 110 when the read transistor 160 is conductive.

The read line 53 is connected to a pixel column which includes the pixel units 101 and functions as the first conductive line for reading out the anode voltage of the organic EL element 110.

The voltage selection switch 60 is provided between (i) the voltage generation circuit 30 and (ii) the read line 53 and the data line 31, and has a function of selecting the connection of the read line 53 with the voltage generation circuit 30 or the connection of the data line 31 with the voltage generation circuit 30.

The control unit 70 has a function of controlling the scanning-line driver circuit 20, the voltage generation circuit 30, the current generation circuit 40, the voltage detection circuit 50, the voltage selection switch 60, and the memory 80. Moreover, the control unit 70 includes a measurement control unit 701, a determining unit 702, and a precharge updating unit 703.

The measurement control unit 701 makes the read transistor 160 conductive, thereby causing the voltage generation circuit 30 to precharge the read line 53. At the same time, the test transistor 140 is also made conductive so that a current flows from the current generation circuit 40 to the organic EL element 110, during which the anode voltage of the organic EL element 110 is measured by the voltage detection circuit 50. Afterward, the measured anode voltage of the organic EL element 110 is outputted to the determining unit 702.

When the determining unit 702 determines that the anode voltage of the organic EL element 110 is not stable, the precharge updating unit 703 updates conditions under which the read line 53 is precharged by the voltage generation circuit 30.

The test transistor 140 is a switching element which forms a current path to the organic EL element 110. The test transistor 140 has a gate which is connected to the control line 22, and a source and a drain one of which is connected to the anode of the organic EL element 110 and the other one of which is connected to the data line 31.

The read transistor 160 is a switching element which forms a voltage path for measuring the anode voltage of the organic EL element 110 with use of the read line 53. The test transistor 160 has a gate which is connected to the control line 22, and a source and a drain one of which is connected to the anode of the organic EL element 110 and the other one of which is connected to the read line 53.

Hereinafter, a method for controlling the display device 2 according to the second embodiment of the present invention is described. This control method allows to detect the characteristic of the organic EL element 110.

FIG. 7 is an operation flowchart which shows the operations of the control unit according to the second embodiment of the present invention, for detecting the current-voltage characteristic of the organic EL element.

At the beginning, the measurement control unit 701 controls the voltage selection switch 60 so that the voltage generation circuit 30 becomes connected with the data line 31 (the measurement control unit 701 selects a contact "a" of the voltage selection switch 60 shown in FIG. 11), causes the voltage generation circuit 30 to provide a voltage for turning off the driving transistor 120, writes the voltage into the capacitance element 150, and then turns the driving transistor 120 off (S10).

Next, the measurement control unit 701 controls the voltage selection switch 60 so that the voltage generation circuit 30 becomes connected with the read line 53 (the measurement control unit 701 selects a contact "b" of the voltage selection switch 60 shown in FIG. 11), and turns on the test transistor 140 and the read transistor 160 by ON voltage application from the scanning-line driver circuit 20 to the control line 22 so that a current application path to the organic EL element 110 and an anode voltage detection path to the organic EL element 110 are established (S11).

Subsequently, the measurement control unit 701 causes the voltage generation circuit 30 to provide a precharge voltage, which is set in advance, to the read line 53 so that the connection lines which extend to the organic EL element 110 are precharged to the voltage (S12).

Next, the measurement control unit 701 causes the current generation circuit 40 to output the inspection current to the data line 31 (S13). At this time, there is no output from the voltage generation circuit 30.

Subsequently, the measurement control unit 701 causes the voltage detection circuit 50 to perform the first detection of a conductive line voltage (S14). The measurement control unit 701 then outputs the result to the determination unit 702.

After a predetermined length of time after Step S14, the measurement control unit 701 causes the voltage detection circuit 50 to perform the second detection of a conductive line voltage (S15). The measurement control unit 701 then outputs the result to the determination unit 702. Here, the conductive line voltage in Step S14 and Step S15 indicates a voltage on the read line 53.

Next, the determination unit 702 determines whether or not a difference between the above two conductive line voltages obtained from the measurement control unit 701 is equal to or greater than a predetermined value (S16).

Finally, when it is determined in Step S16 that the difference between the conductive line voltages is equal to or greater than the predetermined value ("unstable" in S16), the determination unit 702 determines that the measurement of the conductive line voltages is unstable, and the precharge updating unit 703 updates the precharge voltage (S17). At the time of next current-voltage characteristic measurement, a series of the sequence starting from Step S10 is carried out again. It is to be noted that the updated precharge voltage is the conductive line voltage detected for the second time in Step S15.

On the other hand, when it is determined in Step S16 that the difference between the conductive line voltages is smaller than the predetermined value ("stable" in S16), the determination unit 702 determines that the measurement of the conductive line voltages is stable, and the memory 80 stores, as a voltage value for the above inspection current, the conductive line voltage detected for the second time in Step S15 (S18).

It is to be noted that the conductive line voltages detected in Step S14 and Step S15 by the voltage detection circuit 50 for the first and second times may be stored from measurement control unit 701 to the memory 80 and not via the determination unit 702. In this case, in Step S16, the determination unit 702 carries out the above determination by reading the above two conductive line voltages from the memory 80.

Although the detection of a conductive line voltage is carried out twice through Step S14 and Step S15 in the above evaluation method of the current-voltage characteristic of the organic EL element, the measurement control unit 701 may cause the detection of a conductive line voltage three times or more so that the determination unit 702 determines voltage stability based on the three or more voltage values thus detected.

The following shall explain the timing of electric signals as indicated by the operation flowchart shown in FIG. 7.

Figure 12:
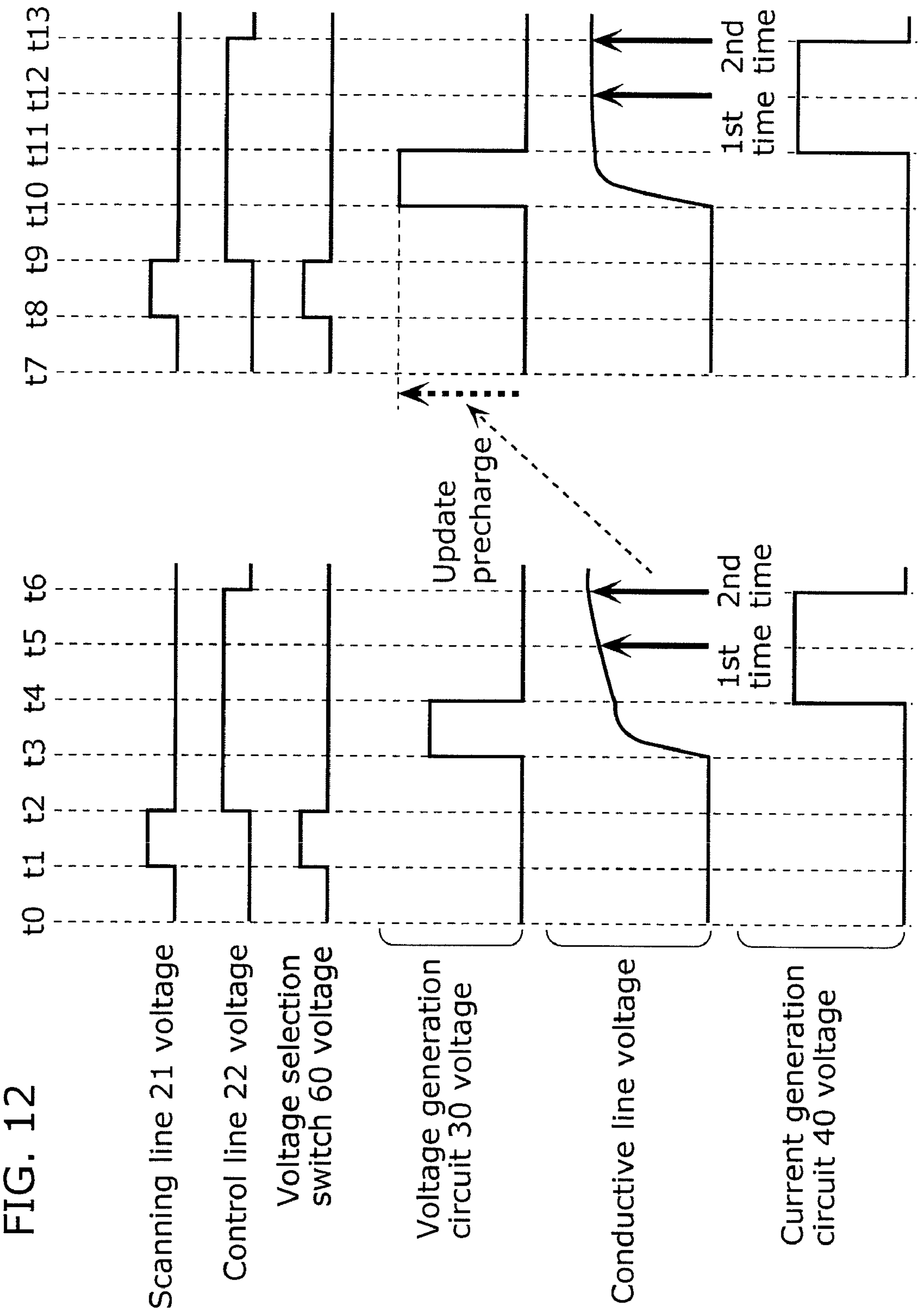
FIG. 12 is a timing chart for detecting the current-voltage characteristic of the organic EL element according to the second embodiment of the present invention.

FIG. 12 shows a timing chart for detecting the current-voltage characteristic of the organic EL element according to the second embodiment of the present invention. In the second embodiment, the conductive line voltage shown in FIG. 12 indicates a voltage of the read line 53. The following description refers only to differences from the timing in the first embodiment, and a description of points in common with the timing in the first embodiment is omitted.

At the beginning, at the time t0, the voltage generation circuit 30 is set to have a voltage for turning off the driving transistor 120.

Next, at the time t1, a voltage level of the voltage selection switch 60 becomes a HIGH level (the contact "a" of the voltage selection switch 60 shown in FIG. 11 is selected) so that the connection of the voltage generation circuit 30 with the data line 31 is selected. At the same time, a voltage level of the scanning line 21 becomes such that the switching transistor 130 is turned on. At the time, the driving transistor 120 is turned off. This means that the source-drain current of the driving transistor 120 will not flow through the organic EL element 110. The operation at the time t0 and the time t1 corresponds to Step S10 of FIG. 7.

Next, at the time t2, the voltage level of the voltage selection switch 60 becomes a LOW level (the contact "b" of the voltage selection switch 60 shown in FIG. 11 is selected) so that the connection of the voltage generation circuit 30 with the read line 53 is selected. At the same time, a voltage level of the scanning line 21 becomes such that the switching transistor 130 is turned on. At the same time, a voltage level of the control line 22 becomes such that the test transistor 140 and the read transistor 160 are turned on. This provides a current path through which a current can be supplied from the data line 31 to the organic EL element 110, and a voltage path for detecting the anode voltage of the organic EL element 110 through the read line 53.

Next, at the time t3, the voltage generation circuit 30 provides a voltage, which is set in advance, to the read line 53. At this time, the precharge is performed on the read line 53.

Next, at the time t5, the voltage detection circuit 50 performs the first detection of a conductive line voltage of the data line 53.

Next, at the time t6, the voltage detection circuit 50 performs the second detection of a conductive line voltage of the data line 53.

At the beginning, at the time t7, the voltage generation circuit 30 is set to have a voltage for turning off the driving transistor 120.

Next, at the time t8, a voltage level of the voltage selection switch 60 becomes a HIGH level (the contact "a" of the voltage selection switch 60 shown in FIG. 11 is selected) so that the connection of the voltage generation circuit 30 with the data line 31 is selected. At the same time, a voltage level of the scanning line 21 becomes such that the switching transistor 130 is turned on. At the time, the driving transistor 120 is turned off. This means that the source-drain current of the driving transistor 120 will not flow through the organic EL element 110.

Next, at the time t9, the voltage level of the voltage selection switch 60 becomes a LOW level (the contact "b" of the voltage selection switch 60 shown in FIG. 11 is selected) so that the connection of the voltage generation circuit 30 with the read line 53 is selected. At the same time, a voltage level of the scanning line 21 becomes such that the switching transistor 130 is turned on. At the same time, a voltage level of the control line 22 becomes such that the test transistor 140 and the read transistor 160 are turned on. This provides a current path through which a current can be supplied from the data line 31 to the organic EL element 110, and a voltage path for detecting the anode voltage of the organic EL element 110 through the read line 53.

Next, at the time t10, the voltage generation circuit 30 provides a voltage, which is set in advance, to the data line 53. At this time, the precharge is performed on the read line 53.

At the time t12, the voltage detection circuit 50 performs the first detection of a conductive line voltage of the read line 53.

Next, at the time t13, the voltage detection circuit 50 performs the second detection of a conductive line voltage of the read line 53.

The display device and a method for controlling the same according to the second embodiment as described above can produce the same effects as the display device and the method for controlling the same according to the first embodiment.

In addition, the current application path and the voltage detection path are provided separately from each other to measure the current-voltage characteristic of the organic EL element, so that the voltage detection is not affected by the voltage drops caused by the switching transistor 130, thus allowing for more accurate measurement of the current-voltage characteristic.

Although the first and the second embodiments have been described as above, the display device and the method for controlling the same according to the present invention are not limited to these embodiments. The present invention also includes other embodiments in which the constituents of the first and second embodiments are combined appropriately, variations of the first and second embodiments which would occur to those skilled in the art and be within the spirit and scope of the present invention, and various apparatuses in which devices for evaluating semiconductor characteristics according to the present invention are incorporated.

Figure 13:
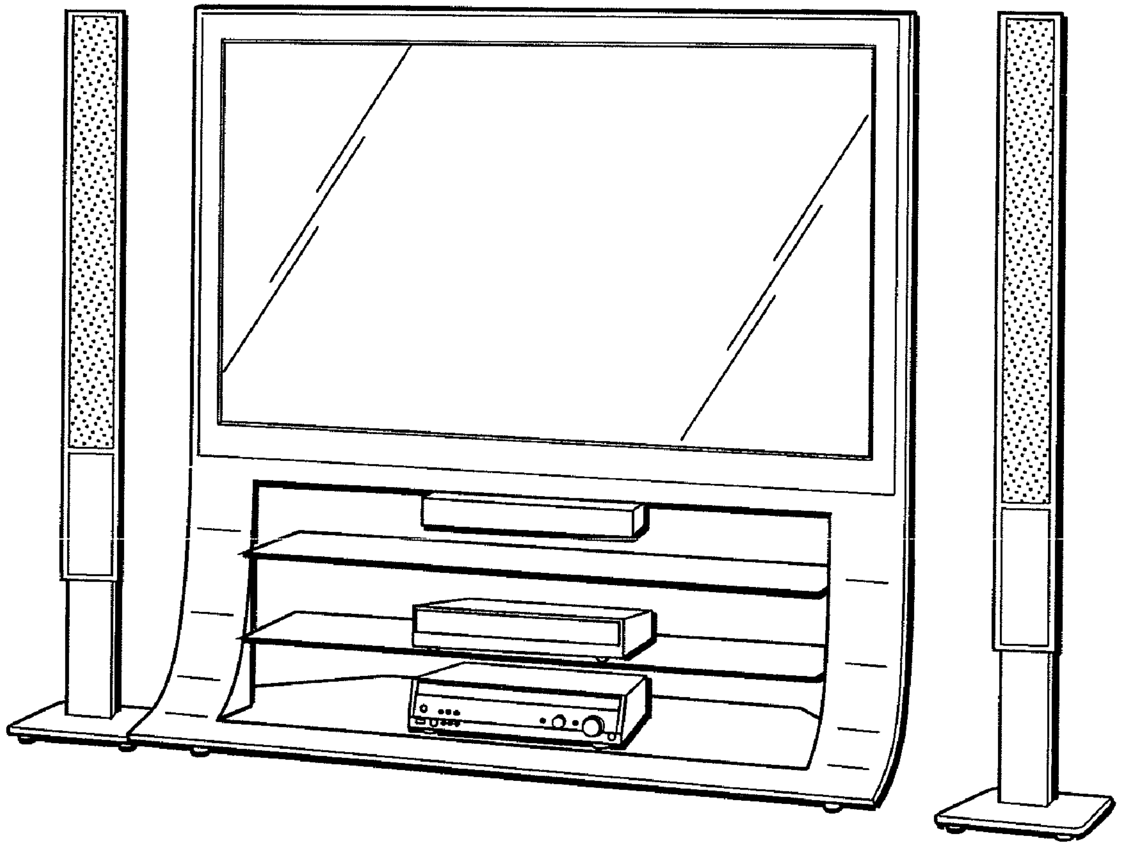
FIG. 13 is an outline view of a thin flat-screen TV which includes a display device according to the present invention.

For example, a display device and a method for controlling the same according to the present invention is included or used in a thin frat-screen TV as shown in FIG. 13. The display device and the method for controlling the same according to the present invention provide a thin flat-screen TV which includes a display for which unevenness in luminance is reduced.

The luminescence element of the pixel unit may have a cathode which is connected to one of a source and a drain of a driving transistor and an anode which is connected to a first power supply, the driving transistor may have a gate, as in the embodiments described above, which is connected to a data line via a switching transistor, and the other one of the source and the drain of the driving transistor may be connected to a second power supply. For this circuitry configuration, electrical potential of the first power supply is set to be higher than that of the second power supply. A test transistor has a gate which is connected to a control line and a source and a drain one of which is connected to the data line and the other one of which to the cathode of the luminescence element. A read transistor has a gate which is connected to a control line and a source and a drain one of which is connected to the read line and the other one of which to the cathode of the luminescence element. This circuitry configuration provides a display device with the same configuration and the same advantageous effect as those of the present invention.

Furthermore, the switching transistor, the test transistor, the read transistor, and the driving transistor, which are described in the first and second embodiments as n-type transistors to be turned on when the voltage level of the gate of the switching transistor is high, may be p-type transistors to be used, and polarity of the data line, the scanning line, and the control line may be inverted. Such a display device provides the same advantageous effects as in the embodiments above.

Although the embodiment according to the present invention assumes that the transistor, which functions as a driving transistor, a switching transistor, a test transistor, or a read transistor is described as a field effect transistor (FET) which has a gate, a source, and a drain, the transistor may be a bipolar transistor which has a base, a collector, and an emitter. This also achieves the object of the present invention and provides the same advantageous effects.

Although the above explanation describes, as the embodiments of the present invention, the structure and method for fast and accurate measurement of the current-voltage characteristic of the organic EL element included in the display device, the same effect is produced by applying the method for controlling the display device according to the present invention to, instead of the organic EL element, a semiconductor element which is incorporated in an electronic device, to measure a current-voltage characteristic thereof. In this case, the effect produced by the present invention is larger as the electronic device has a larger circuit, that is, as a conductive line for measuring the current-voltage characteristic of the semiconductor element is longer, and the number of elements in peripheral circuitry is larger.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable particularly to organic EL flat panel displays having a display device, and is well suited for use as a display device including a display for which correction of variations in characteristics is required or as a method for driving such a display device.

What is claimed is:

1. A display device, comprising:

a luminescence element including a first electrode and a second electrode;

a first power line electrically connected to the first electrode;

a second power line electrically connected to the second electrode;

a capacitor for holding a capacitor voltage, the capacitor including a third electrode and a fourth electrode;

a driver provided between the first electrode and the first power line for passing a signal current between the first power line and the second power line, the signal current corresponding to the capacitor voltage held by the capacitor;

a data line electrically connected to one of the third electrode and the fourth electrode for supplying a signal voltage to one of the third electrode and the fourth electrode;

a first switch provided between the data line and the one of the third electrode and the fourth electrode for causing the capacitor to hold the capacitor voltage, the capacitor voltage corresponding to the signal voltage;

a voltage generation circuit electrically connected to the data line for supplying the signal voltage to the data line and supplying a pre-charge voltage to the data line;

a current generation circuit electrically connected to the data line for supplying an inspection current to the luminescence element;

a voltage detection circuit electrically connected to the data line for detecting a luminescence voltage of the luminescence element;

a second switch electrically connected to the first electrode and the data line; and a controller configured to:

turn off the first switch to turn off the driver;

turn on the second switch;

control the voltage generation circuit to supply the pre-charge voltage to the data line;

control the current generation circuit to supply the inspection current to the first electrode of the luminescence element plural times through the data line and the second switch;

control the voltage detection circuit to detect, the plural times through the data line and the second switch, voltage values of the first electrode supplied with the inspection current; and control the voltage generation circuit to supply the data line with an updated voltage that is higher than the pre-charge voltage when a difference in the voltage values of the first electrode detected the plural times is at least a predetermined value.

2. The display device according to claim 1, further comprising:

a memory in which data is stored, wherein the controller is further configured to:

control the current generation circuit to supply the inspection current to the luminescence element second plural times after controlling the voltage generation circuit to supply the data line with the updated voltage that is higher than the pre-charge voltage to pre-charge the data line further to the updated voltage;

control the voltage detection circuit to detect, the second plural times through the data line and the second switch, second voltage values of the first electrode supplied with the inspection current; and store, in the memory, the second voltage values of the first electrode detected by the voltage detection circuit when a difference in the second voltage values of the first electrode detected the second plural times is less than the predetermined value.

3. The display device according to claim 2, wherein the controller is further configured to store, in the memory, a last detected value of the second voltage values of the first electrode.

4. The display apparatus according to claim 2, wherein the controller is further configured to:

calculate a current-voltage characteristic of the luminescence element based on the inspection current and the stored second voltage values of the first electrode;

correct a video signal received from outside, based on the current-voltage characteristic of the luminescence element; and control the voltage generation circuit to supply the data line with the signal voltage corresponding to the corrected video signal.

5. The display apparatus according to claim 2, wherein a video signal, received from outside, is divided on a per-frame basis, and each frame has a writing period in which the signal voltage corresponding to the video signal for each pixel is written in the capacitor and a non-writing period in which the signal voltage is not written in the capacitor, a period in which the data line is not supplied with the signal voltage is the non-writing period, and the non-writing period includes a first non-writing period and a second non-writing period which are different from each other, the first non-writing period is a period in which the voltage values are detected when the data line is supplied with the pre-charge voltage, and the second non-writing period is a period in which the second voltage values are detected when the data line is supplied with the updated voltage.

6. The display device according to claim 1, further comprising:

a memory in which data is stored, wherein the controller is further configured to store, in the memory, the voltage values of the first electrode detected by the voltage detection circuit when a difference in the voltage values of the first electrode detected the plural times is less than the predetermined value.

7. The display device according to claim 6, wherein the controller is further configured to store, in the memory, a last detected value of the voltage values of the first electrode detected the plural times.

8. The display apparatus according to claim 6, wherein the controller is further configured to:

calculate a current-voltage characteristic of the luminescence element based on the inspection current and the stored voltage values of the first electrode;

correct a video signal received from outside, based on the current-voltage characteristic of the luminescence element; and control the voltage generation circuit to supply the data line with the signal voltage corresponding to the corrected video signal.

9. The display apparatus according to claim 1, wherein the controller turns off the first switch, turns on the second switch, controls the voltage generation circuit to supply the pre-charge voltage, controls the current generation circuit, and controls the voltage detection circuit during a period in which the data line is not supplied with the signal voltage corresponding to a video signal received from outside.

10. The display apparatus according to claim 9, wherein the video signal is divided on a per-frame basis, and each frame has a writing period in which the signal voltage corresponding to the video signal for each pixel is written in the capacitor and a non-writing period in which the signal voltage is not written in the capacitor, and the period in which the data line is not supplied with the signal voltage is the non-writing period.

11. The display apparatus according to claim 1, further comprising:

pixels, each of which includes the luminescence element and the driver, wherein the pixels are disposed in rows and columns.

12. The display device according to claim 1, wherein the first electrode of the luminescence element is an anode electrode, and a voltage of the first power line is higher than a voltage of the second power line so that a current flows from the first power line to the second power line.

13. A method for controlling a display device, the display device including:

a luminescence element including a first electrode and a second electrode;

a first power line electrically connected to the first electrode;

a second power line electrically connected to the second electrode;

a capacitor for holding a capacitor voltage, the capacitor including a third electrode and a fourth electrode;

a driver provided between the first electrode and the first power line for passing a signal current between the first power line and the second power line, the signal current corresponding to the capacitor voltage held by the capacitor;

a data line electrically connected to one of the third electrode and the fourth electrode for supplying a signal voltage to one of the third electrode and the fourth electrode;

a first switch provided between the data line and the one of the third electrode and the fourth electrode for causing the capacitor to hold the capacitor voltage, the capacitor voltage corresponding to the signal voltage;

a voltage generation circuit electrically connected to the data line for supplying the signal voltage to the data line and supplying a pre-charge voltage to the data line;

a current generation circuit electrically connected to the data line for supplying an inspection current to the luminescence element;

a voltage detection circuit electrically connected to the data line for detecting a luminescence voltage of the luminescence element; and a second switch electrically connected to the first electrode and the data line, the method comprising:

turning off the first switch to turn off the driver;

turning on the second switch;

controlling the voltage generation circuit to supply the pre-charge voltage to the data line;

controlling the current generation circuit to supply the inspection current to the first electrode of the luminescence element plural times through the data line and the second switch;

controlling the voltage detection circuit to detect, the plural times through the data line and the second switch, voltage values of the first electrode supplied with the inspection current; and controlling the voltage generation circuit to supply the data line with an updated voltage that is higher than the pre-charge voltage when a difference in the voltage values of the first electrode detected the plural times is at least a predetermined value.

14. A display device, comprising:

a luminescence element including a first electrode and a second electrode;

a first power line electrically connected to the first electrode;

a second power line electrically connected to the second electrode;

a capacitor for holding a capacitor voltage, the capacitor including a third electrode and a fourth electrode;

a driver provided between the first electrode and the first power line for passing a signal current between the first power line and the second power line, the signal current corresponding to the capacitor voltage held by the capacitor;

a data line electrically connected to one of the third electrode and the fourth electrode for supplying a signal voltage to one of the third electrode and the fourth electrode;

a first switch provided between the data line and the one of the third electrode and the fourth electrode for causing the capacitor to hold the capacitor voltage, the capacitor voltage corresponding to the signal voltage;

a current generation circuit electrically connected to the data line for supplying an inspection current to the luminescence element;

a read line which reads a voltage of the first electrode;

a voltage generation circuit electrically connected to the data line for supplying the signal voltage to the data line and electrically connected to the read line for supplying a pre-charge voltage to the read line;

a voltage detection circuit electrically connected to the read line for detecting a luminescence voltage of the luminescence element a second switch electrically connected to the first electrode and the data line;

a third switch electrically connected to the first electrode and the read line;

a fourth switch electrically connected to the voltage generation circuit and one of the data line and the read line; and a controller configured to:

turn off the first switch to turn off the driver;

control the fourth switch to connect the voltage generation circuit and the read line;

turn on the second switch and the third switch;

control the voltage generation circuit to supply the pre-charge voltage to the read line;

control the current generation circuit to supply the inspection current to the first electrode of the luminescence element through the data line and the second switch; and control the voltage detection circuit to detect, through the data line and the second switch, a voltage value of the first electrode supplied with the inspection current.

* * * * *